US010698370B2

(12) United States Patent
Naito et al.

(10) Patent No.: US 10,698,370 B2
(45) Date of Patent: Jun. 30, 2020

(54) DEVICE CONTROL METHOD, DEVICE CONTROL APPARATUS AND DEVICE CONTROL SYSTEM

(71) Applicant: Panasonic Intellectual Property Management Co., Ltd., Osaka (JP)

(72) Inventors: Ayaka Naito, Osaka (JP); Hiroko Sugimoto, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 15 days.

(21) Appl. No.: 16/170,543

(22) Filed: Oct. 25, 2018

(65) Prior Publication Data

US 2019/0187633 A1 Jun. 20, 2019

(30) Foreign Application Priority Data

Dec. 20, 2017 (JP) ................. 2017-243691
Jul. 26, 2018 (JP) ................. 2018-140163

(51) Int. Cl.
*G05B 13/02* (2006.01)
*G05B 15/02* (2006.01)
*G05B 19/40* (2006.01)
*G06F 11/30* (2006.01)

(52) U.S. Cl.
CPC ................. *G05B 13/024* (2013.01)

(58) Field of Classification Search
CPC ............... G06F 11/3024; G05B 15/02; G05B 2219/41248; G05B 19/4083

USPC ........................................... 700/40
See application file for complete search history.

(56) References Cited

U.S. PATENT DOCUMENTS

| 6,366,981 | B1 * | 4/2002 | Koike ............... G06F 11/3485 711/112 |
| 10,520,911 | B2 * | 12/2019 | Beecroft ............... F02C 9/00 |
| 2010/0204852 | A1 * | 8/2010 | Delaloye ............ G05B 23/0243 701/4 |

FOREIGN PATENT DOCUMENTS

JP 2015-176172 10/2015

* cited by examiner

*Primary Examiner* — Michael J Brown
(74) *Attorney, Agent, or Firm* — Wenderoth, Lind & Ponack, L.L.P.

(57) ABSTRACT

A device control apparatus which controls a second device connected in place of a first device acquires first performance information indicative of performance of the first device and second performance information indicative of performance of the second device, generates a correction function based on a difference between the first performance information and the second performance information, generates, from first operation mode information for causing the first device to operate by first setting, the first operation mode information being generated based on log information of the first device, second operation mode information for causing the second device to operate by second setting corresponding to the first setting based on the correction function, and transmits the second operation mode information to the second device.

10 Claims, 29 Drawing Sheets

FIG. 5

| WIND VOLUME NUMERICAL VALUE | WIND VOLUME OF FIRST DEVICE, 2017 MODEL, A SERIES | WIND VOLUME OF SECOND DEVICE, 2023 MODEL, A SERIES |
|---|---|---|
| 7 | POWER | POWER |
| 6 | — | STRONG WIND |
| 5 | STRONG WIND | SLIGHTLY STRONG WIND |
| 4 | WEAK WIND | — |
| 3 | LIGHT WIND | WEAK WIND |
| 2 | QUIET WIND | LIGHT WIND |
| 1 | — | QUIET WIND |

FIG. 6
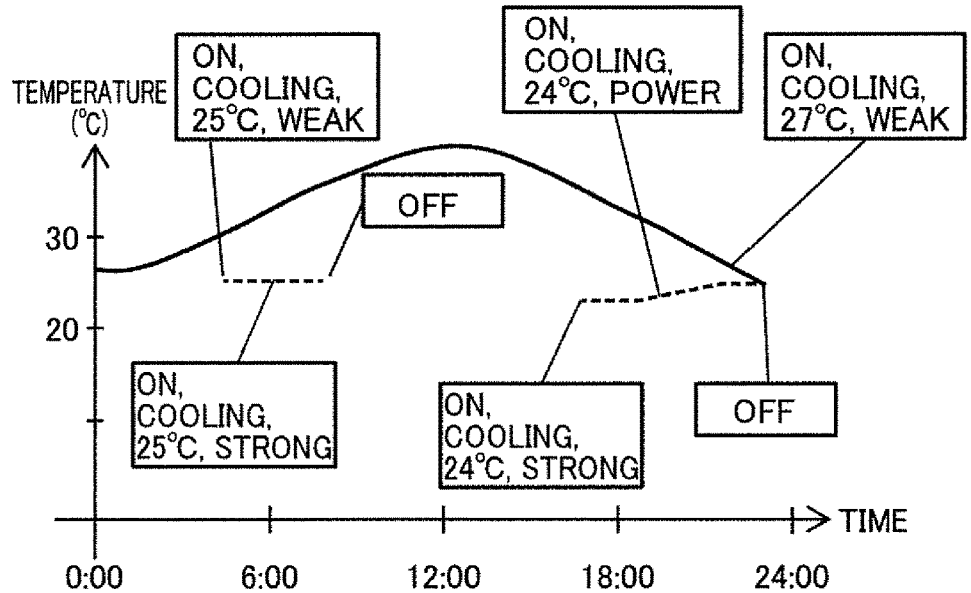
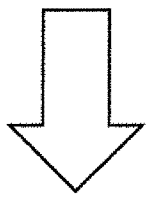
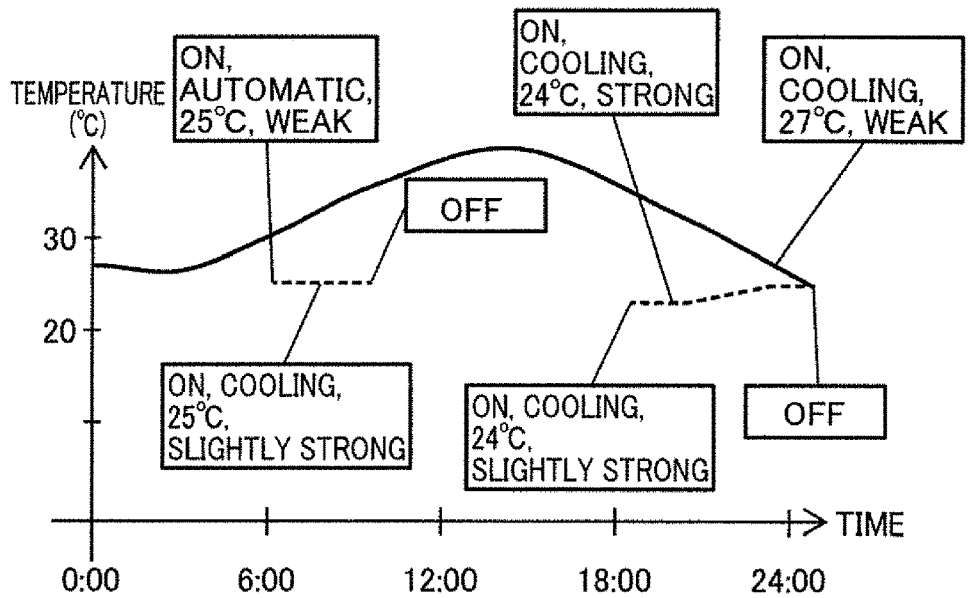

FIG. 7

|     | 17A | 17B | 17C | ... | 23A | 23B | 23C | 23D |
|-----|-----|-----|-----|-----|-----|-----|-----|-----|
| 17A |     | $\alpha_{17A17B}$ | $\alpha_{17A17C}$ | ... | $\alpha_{17A23A}$ | $\alpha_{17A23B}$ | $\alpha_{17A23C}$ | $\alpha_{17A23D}$ |
| 17B | $\alpha_{17B17A}$ |     | $\alpha_{17B17C}$ | ... | $\alpha_{17B23A}$ | $\alpha_{17B23B}$ | $\alpha_{17B23C}$ | $\alpha_{17B23D}$ |
| 17C | $\alpha_{17C17A}$ | $\alpha_{17C17B}$ |     | ... | $\alpha_{17C23A}$ | $\alpha_{17C23B}$ | $\alpha_{17C23C}$ | $\alpha_{17C23D}$ |
| ⋮   | ⋮   | ⋮   | ⋮   | ⋮   | ⋮   | ⋮   | ⋮   | ⋮   |
| 23A | $\alpha_{23A17A}$ | $\alpha_{23A17B}$ | $\alpha_{23A17C}$ | ... |     | $\alpha_{23A23B}$ | $\alpha_{23A23C}$ | $\alpha_{23A23D}$ |
| 23B | $\alpha_{23B17A}$ | $\alpha_{23B17B}$ | $\alpha_{23B17C}$ | ... | $\alpha_{23B23A}$ |     | $\alpha_{23B23C}$ | $\alpha_{23B23D}$ |
| 23C | $\alpha_{23C17A}$ | $\alpha_{23C17B}$ | $\alpha_{23C17C}$ | ... | $\alpha_{23C23A}$ | $\alpha_{23C23B}$ |     | $\alpha_{23C23D}$ |
| 23D | $\alpha_{23D17A}$ | $\alpha_{23D17B}$ | $\alpha_{23D17C}$ | ... | $\alpha_{23D23A}$ | $\alpha_{23D23B}$ | $\alpha_{23D23C}$ |     |

FIG. 8

| DEVICE ID | UPDATE DATE | AUTOMATIC MODE FUNCTION |
|---|---|---|
| aaa | 2017-07-08 | $f_{aaa\_0}(x_1,\cdots,x_n)$ |
| aaa | 2017-07-15 | $f_{aaa\_1}(x_1,\cdots,x_n)$ |
| aaa | 2017-07-22 | $f_{aaa\_2}(x_1,\cdots,x_n)$ |
| bbb | 2019-08-03 | $f_{bbb\_0}(x_1,\cdots,x_n)$ |
| bbb | 2019-08-10 | $f_{bbb\_1}(x_1,\cdots,x_n)$ |
| ccc | 2019-08-05 | $f_{ccc\_0}(x_1,\cdots,x_n)$ |
| ccc | 2019-08-12 | $f_{ccc\_1}(x_1,\cdots,x_n)$ |
| ... | ... | ... |

FIG. 9

| DEVICE ID | LATEST UPDATE DATE | FILE PATH FOR HISTORY OF AUTOMATIC MODE FUNCTION |
|---|---|---|
| aaa | 2017-07-22 | ···¥automode_file¥aaa |
| bbb | 2019-08-10 | ···¥automode_file¥bbb |
| ccc | 2019-08-12 | ···¥automode_file¥ccc |
| ... | ... | ... |

FIG. 10

| TIME | ON/OFF | CONTROL MODE | WIND DIRECTION | WIND VOLUME | TEMPERATURE | OPERATION MODE (AUTOMATIC) | WIND VOLUME (AUTOMATIC) | WIND DIRECTION (AUTOMATIC) | TEMPERATURE (AUTOMATIC) | OUTSIDE TEMPERATURE | ROOM TEMPERATURE | HUMIDITY | MODE CHANGE FLAG | WIND DIRECTION CHANGE FLAG | WIND VOLUME CHANGE FLAG | TEMPERATURE CHANGE FLAG | USER OPERATION FLAG | REMOTE OPERATION FLAG |
|---|---|---|---|---|---|---|---|---|---|---|---|---|---|---|---|---|---|---|
| 2017-07-03 18:00:15 | ON | AUTOMATIC | AUTOMATIC | AUTOMATIC | AUTOMATIC | COOLING | STRONG | UPWARD | 25 | 32 | 30 | 76 | 0 | 0 | 0 | 0 | 1 | 0 |
| 2017-07-03 18:30:00 | | AUTOMATIC | DOWNWARD | AUTOMATIC | AUTOMATIC | COOLING | STRONG | DOWNWARD | 25 | 32 | 27 | 60 | 0 | 1 | 0 | 0 | 1 | 0 |
| 2017-07-03 18:30:00 | | AUTOMATIC | DOWNWARD | WEAK | AUTOMATIC | COOLING | WEAK | DOWNWARD | 25 | 32 | 27 | 50 | 0 | 0 | 1 | 0 | 1 | 0 |
| ... | ... | ... | ... | ... | ... | ... | ... | ... | ... | ... | ... | ... | ... | ... | ... | ... | ... | ... |

FIG. 11

| USER ID | SEX | DATE OF BIRTH | DEVICE ID | PRODUCT NUMBER | DATE OF PURCHASE | SET-UP PLACE |
|---|---|---|---|---|---|---|
| 123 | MALE | 1977-01-31 | aaa | 17AAxxx | 2017-07-08 | LIVING ROOM |
| 234 | FEMALE | 1974-07-09 | bbb | 19AAyyy | 2019-08-03 | LIVING ROOM |
| 123 | MALE | 1977-01-31 | ccc | 18BBzzz | 2019-08-05 | BED ROOM |
| ... | ... | ... | ... | ... | ... | ... |

FIG. 12

| PRODUCT NUMBER | MODEL (YEAR) | SERIES | NUMBER OF TATAMI MATS | PERFORMANCE INFORMATION |
|---|---|---|---|---|
| 17AAxxx | 17 | A | 14 | WIND VOLUME PERFORMANCE |
| 19AAyyy | 19 | A | 14 | WIND VOLUME PERFORMANCE |
| 18BBzzz | 18 | B | 8 | WIND VOLUME PERFORMANCE |
| ... | ... | ... | ... | ... |

FIG. 28
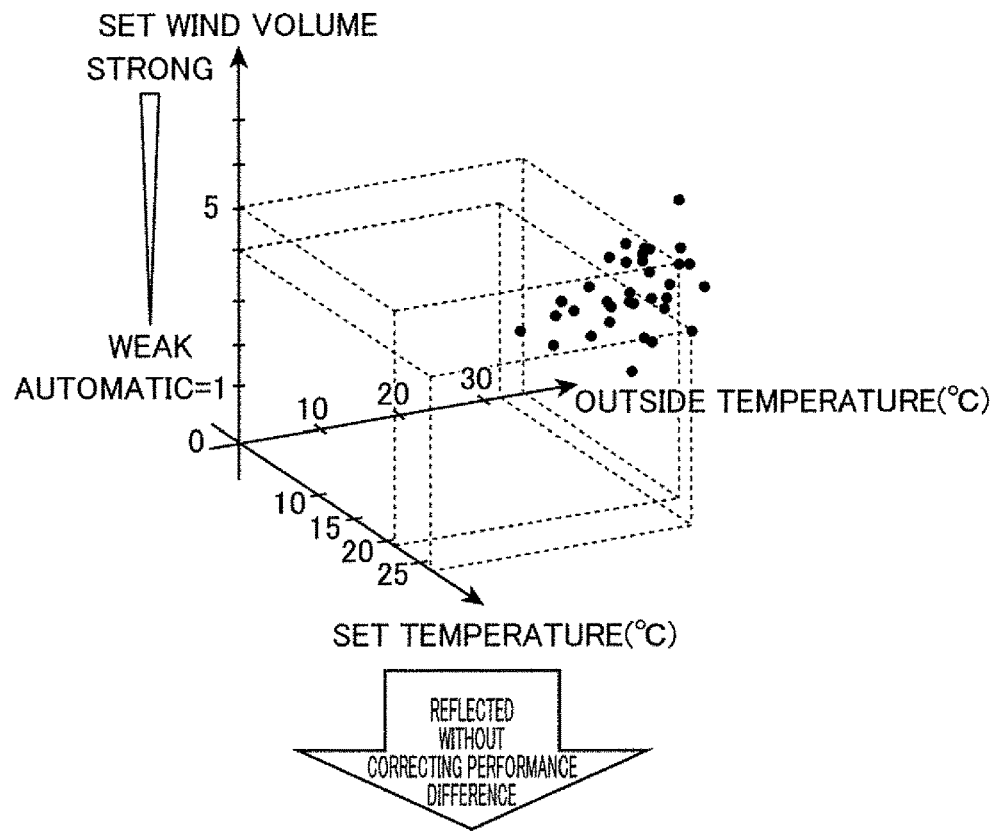
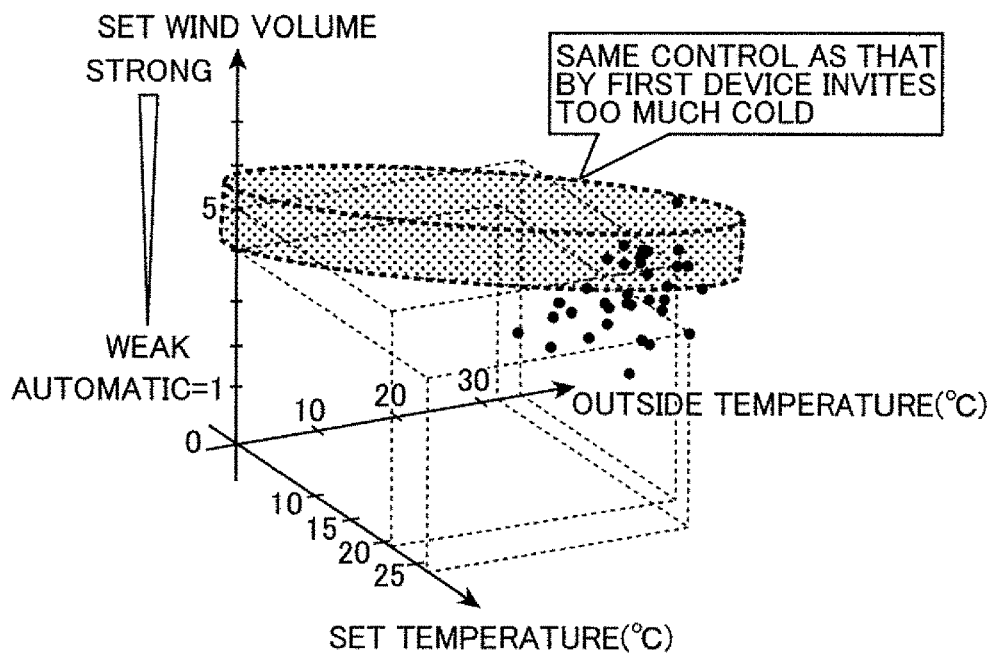

FIG. 29
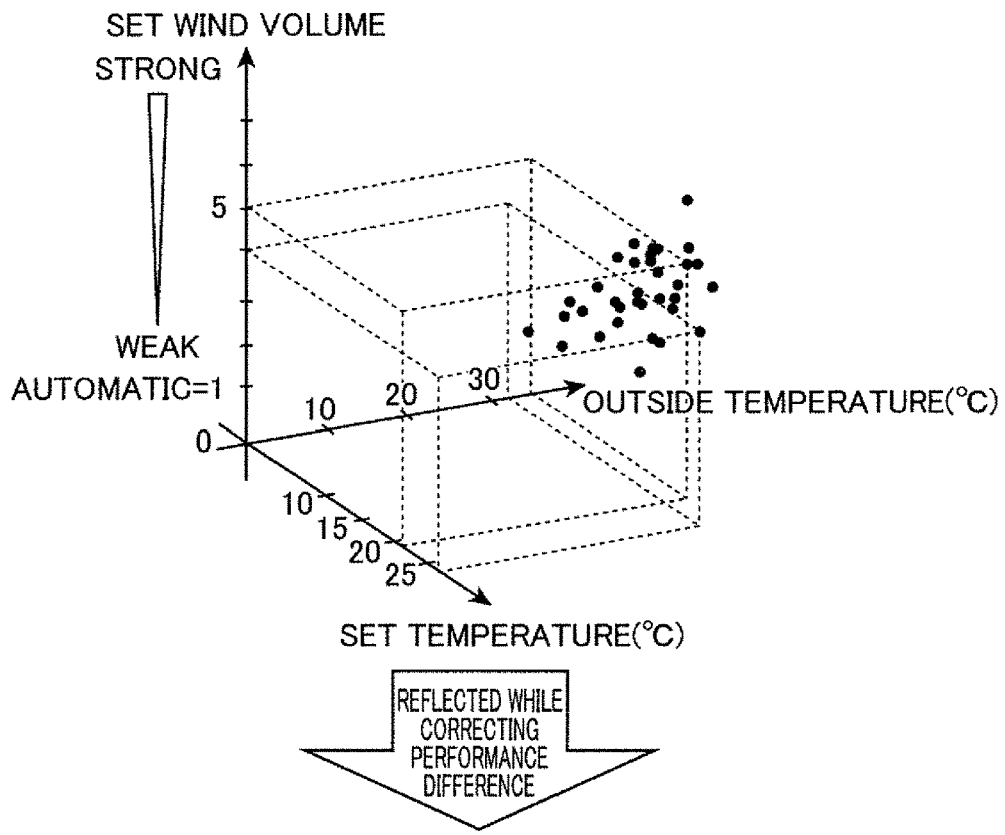
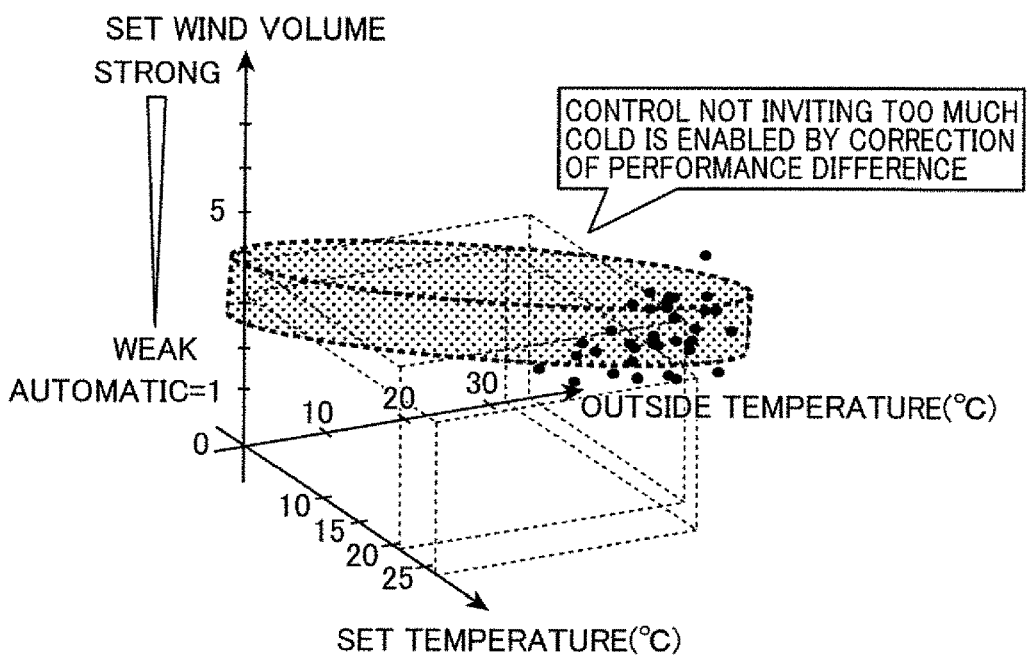

DEVICE CONTROL METHOD, DEVICE CONTROL APPARATUS AND DEVICE CONTROL SYSTEM

FIELD OF THE INVENTION

The present disclosure relates to a device control method, a device control apparatus, and a device control system for controlling a second device connected in place of a first device.

BACKGROUND ART

In recent years, every device is connected to the Internet to enable remote control of the device or common use of setting of a plurality of devices.

On the other hand, AI (Artificial Intelligence) has been advanced in devices, so that use of AI also in home appliances enables automatic control reflecting users' preference.

Along therewith, at the time of replacement of a device, it is assumed that a user's need arises to use setting environment of the device used so far (hereinafter, referred to as a former device or a first device) also for a device to be newly used (hereinafter, referred to as a new device or a second device).

For example, Unexamined Japanese Patent Publication No. 2015-176172 discloses a device control apparatus which controls, via networks, a shared device commonly used by a plurality of users and installed in a common space. A conventional device control apparatus calculates setting information for use in a function provided by a shared device based on use history information of, among personal devices owned personally by the respective users in a common space, personal devices which provide functions the same as or similar to the functions provided by the shared device, and sets the setting information to the shared device via networks.

However, in the above-described conventional art, when replacing a first device by a second device, a difference between performance of the first device and performance of the second device is not taken into consideration, so that further improvement is required.

SUMMARY OF THE INVENTION

The present disclosure has been made to solve the above problem, and an object thereof is to provide a device control method, a device control apparatus, and a device control system which, at the time of replacement of a first device by a second device, enable setting contents of the first device to be ported to the second device taking into consideration a difference in performance of the first device and performance of the second device, thereby providing an optimum environment according to user's preference.

A device control method according to one aspect of the present disclosure is a device control method in a device control apparatus which controls a second device connected in place of a first device, the method including acquiring first performance information indicative of performance of the first device and second performance information indicative of performance of the second device; generating a correction function based on a difference between the first performance information and the second performance information; generating, from first operation mode information for causing the first device to operate by first setting, the first operation mode information being generated based on log information of the first device, second operation mode information for causing the second device to operate by second setting corresponding to the first setting based on the correction function; and transmitting the second operation mode information to the second device.

BRIEF DESCRIPTION OF THE DRAWINGS

FIG. 5 is a diagram for describing generation of a correction function for correcting a difference in wind volume performance in a case where a first device and a second device are air conditioners;

FIG. 6 is a diagram for describing a difference in control due to a difference between performance of the first device and performance of the second device;

FIG. 7 is a diagram showing one example of a table stored in a correction function storage portion in the present embodiment;

FIG. 8 is a diagram showing one example of a table stored in an automatic mode function DB in the present embodiment;

FIG. 9 is a diagram showing another example of a table stored in the automatic mode function DB in the present embodiment;

FIG. 10 is a diagram showing one example of a table stored in a device log DB in the present embodiment;

FIG. 11 is a diagram showing one example of a table stored in a user information DB in the present embodiment;

FIG. 12 is a diagram showing one example of a table stored in a product information DB in the present embodiment;

FIG. 28 is a diagram for describing control contents of the second device in an automatic mode in a case where, at the time of porting an automatic mode function of the first device to the second device, the automatic mode function of the first device is not corrected based on a performance difference between the first device and the second device; and FIG. 29 is a diagram for describing control contents of the second device in the automatic mode in a case where, at the time of porting the automatic mode function of the first device to the second device, the automatic mode function of the first device is corrected based on a performance difference between the first device and the second device.

DESCRIPTION OF EMBODIMENTS

Knowledge Underlying the Present Disclosure

Figure 1:
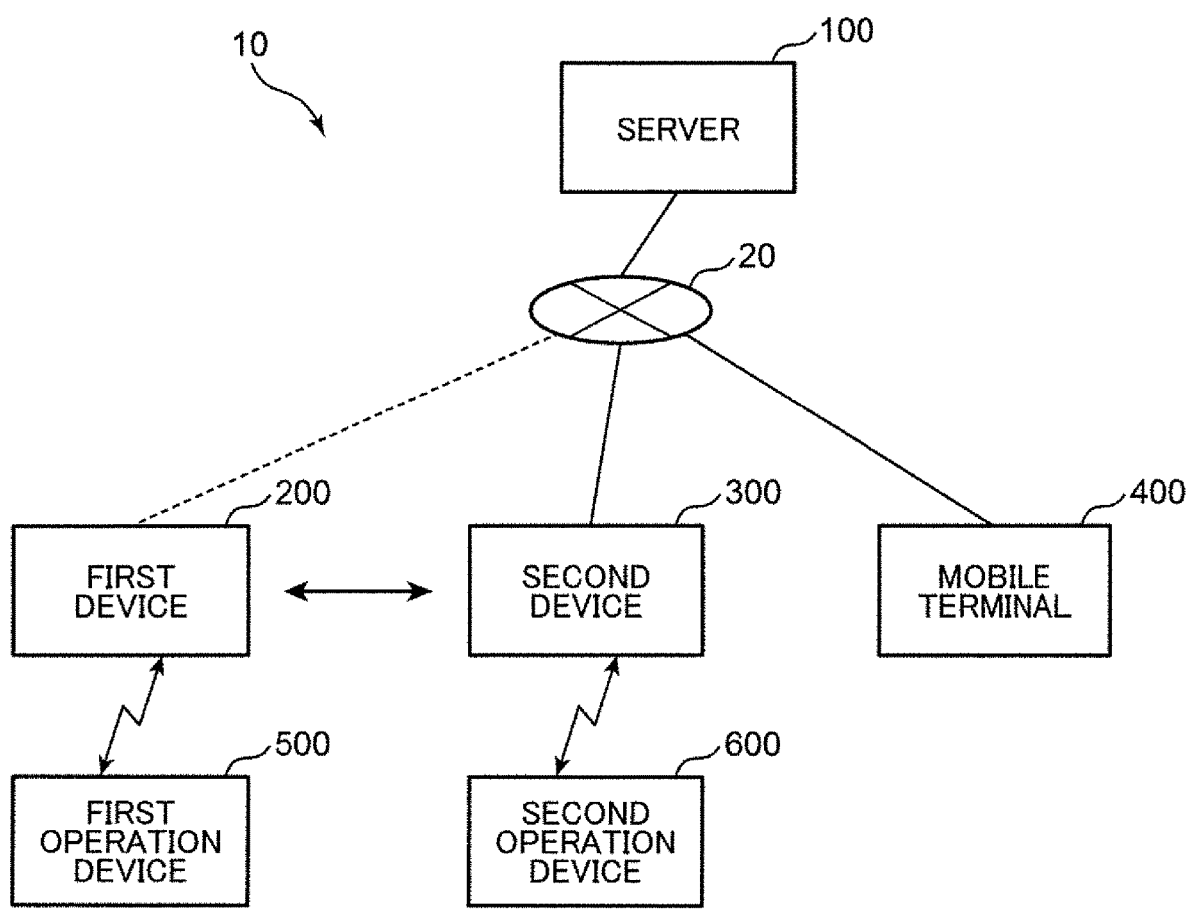
FIG. 1 is a diagram showing an overall configuration of a device control system in an embodiment of the present disclosure.

As described above, a conventional device control apparatus calculates setting information for use in a function provided by a shared device based on use history information of, among personal devices owned personally by the respective users in a common space, the personal devices which provide functions the same as or similar to the functions provided by the shared device, and sets the setting information to the shared device via networks.

However, in a conventional device control apparatus, when reflecting setting information of a personal device owned personally by a user on setting information of a shared device, a difference between performance of the personal device and performance of the shared device is not taken into consideration, so that an optimum environment according to user's preference may not be provided.

In order to solve the above problem, a device control method according to one aspect of the present disclosure is a device control method in a device control apparatus which controls a second device connected in place of a first device, the method including acquiring first performance information indicative of performance of the first device and second performance information indicative of performance of the second device; generating a correction function based on a difference between the first performance information and the second performance information; generating, from first operation mode information for causing the first device to operate by first setting, the first operation mode information being generated based on log information of the first device, second operation mode information for causing the second device to operate by second setting corresponding to the first setting based on the correction function; and transmitting the second operation mode information to the second device.

According to the configuration, the first performance information indicative of performance of the first device and the second performance information indicative of performance of the second device are acquired. A correction function is generated based on a difference between the first performance information and the second performance information. From the first operation mode information for causing the first device to operate by first setting, the first operation mode information being generated based on log information of the first device, second operation mode information for causing the second device to operate by second setting corresponding to the first setting is generated based on the correction function. The second operation mode information is transmitted to the second device.

Accordingly, from the first operation mode information for causing the first device to operate by first setting, the first operation mode information being generated based on log information of the first device, the second operation mode information for causing the second device to operate by second setting corresponding to the first setting is generated based on the correction function generated based on a difference between the first performance information and the second performance information, Thus, at the time of replacement of the first device by the second device, setting contents of the first device can be ported to second device taking into consideration a difference between performance of the first device and performance of the second device, thereby providing an optimum environment according to user's preference.

The above device control method may further include: acquiring a plurality of pieces of performance information each indicative of performance of each of a plurality of devices including the first device and the second device; and generating a plurality of correction functions based on a difference between performance information of each combination among the plurality of devices, in which the generation of a correction function includes extracting the correction function corresponding to a combination between the first device and the second device from among the plurality of correction functions.

According to the configuration, a plurality of pieces of performance information each indicative of performance of each of a plurality of devices including the first device and the second device are acquired. A plurality of correction functions are generated based on a difference between performance information of each combination among the plurality of devices. In the generation of a correction function, a correction function corresponding to a combination between the first device and the second device is extracted from among the plurality of correction functions.

Accordingly, since a plurality of correction functions are generated in advance based on a difference between performance information of each combination among the plurality of devices, a correction function corresponding to a combination between the first device and the second device can be extracted with ease from among the plurality of correction functions.

The above device control method may be also configured such that the log information includes a sensor value, and the first operation mode information includes a plurality of pieces of the first operation mode information generated at every predetermined period, and the device control method further includes detecting a first time point where abnormality of the sensor value has occurred in the past, in which the generation of the second operation mode information includes extracting the first operation mode information generated before the first time point from among the plurality of pieces of first operation mode information and generating the second operation mode information from the extracted first operation mode information based on the correction function.

According to the configuration, the log information includes a sensor value. The first operation mode information includes a plurality of pieces of the first operation mode information generated at every predetermined period. A first time point where abnormality of the sensor value has occurred in the past is detected. In the generation of the second operation mode information, the first operation mode information generated before the first time point is extracted from among the plurality of pieces of first operation mode information, and the second operation mode information is generated from the extracted first operation mode information based on the correction function.

Accordingly, since the second operation mode information is generated from the first operation mode information generated before the first time point where deterioration of the first device is estimated to have occurred due to abnormality of the sensor value of the first device that occurred in the past, the second operation mode information can be generated from the first operation mode information generated before deterioration of the first device while taking into consideration a change of the first operation mode information due to deterioration of the first device, thereby enabling control of the second device according to user's preference by using the second operation mode information.

The above device control method may be also configured such that the log information includes a sensor value, and the device control method further includes: detecting a first time point where abnormality of the sensor value of the first device has occurred in the past, in which the generation of the second operation mode information includes generating the first operation mode information based on the log information generated before the first time point and generating the second operation mode information from the generated first operation mode information based on the correction function.

According to the configuration, the log information includes a sensor value. A first time point where abnormality of the sensor value has occurred in the past is detected. In the generation of the second operation mode information, the first operation mode information is generated based on log information before the first time point, and the second operation mode information is generated from the generated first operation mode information based on the correction function.

Accordingly, since the first operation mode information is generated based on log information before the first time point where deterioration of the first device is estimated to have occurred due to abnormality of the sensor value of the first device that occurred in the past and the second operation mode information is generated from the generated first operation mode information, the second operation mode information can be generated from the first operation mode information generated based on log information before deterioration of the first device while taking into consideration a change of the first operation mode information due to deterioration of the first device, thereby enabling control of the second device according to user's preference by using the second operation mode information.

The above device control method may be also configured such that the log information includes a sensor value, and the first operation mode information includes a plurality of pieces of the first operation mode information generated at every predetermined period, and the device control method further includes: detecting a first time point where abnormality of the sensor value has occurred in the past; and determining whether or not a second time point is present, where the first operation mode information generated before the first time point has changed from immediately preceding first operation mode information among the plurality of pieces of first operation mode information, in which when the determination is made that the second time point is present, the generation of the second operation mode information includes extracting the first operation mode information generated before the second time point from among the plurality of pieces of first operation mode information and generating the second operation mode information from the extracted first operation mode information based on the correction function.

According to the configuration, the log information includes a sensor value. The first operation mode information includes a plurality of pieces of the first operation mode information generated at every predetermined period. A first time point where abnormality of the sensor value has occurred in the past is detected. Determination is made as to whether or not a second time point is present where the first operation mode information generated before the first time point has changed from immediately preceding first operation mode information among the plurality of pieces of first operation mode information. In the generation of the second operation mode information, when the determination is made that the second time point is present, the first operation mode information generated before the second time point is extracted from among the plurality of pieces of first operation mode information, and the second operation mode information is generated from the extracted first operation mode information based on the correction function.

Accordingly, in a case where, before the first time point where deterioration of the first device is estimated to have occurred, a second time point as a sign of deterioration of the first device is present where the first operation mode information has changed from immediately preceding first operation mode information, the second operation mode information is generated from the first operation mode information generated before the second time point, so that the second operation mode information can be generated from the first operation mode information generated before the second time point where a sign of deterioration of the first device appears, thereby enabling control of the second device further according to user's preference by using the second operation mode information.

The above device control method may be also configured such that when the determination is made that the second time point is not present, the generation of the second operation mode information includes extracting the first operation mode information generated before the first time point from among the plurality of pieces of first operation mode information and generating the second operation mode information from the extracted first operation mode information based on the correction function.

According to the configuration, in the generation of the second operation mode information, when the determination is made that the second time point is not present, the first operation mode information generated before the first time point is extracted from among the plurality of pieces of first operation mode information, and the second operation mode information is generated from the extracted first operation mode information based on the correction function.

Accordingly, when the first device deteriorates without a sign, the second operation mode information can be generated from the first operation mode information generated before the first time point where the first device deteriorated, thereby enabling control of the second device further according to user's preference by using the second operation mode information.

The above device control method may be also configured such that when the determination is made that the second time point is not present, the generation of the second operation mode information includes generating the first operation mode information based on the log information before the first time point and generating the second operation mode information from the generated first operation mode information based on the correction function.

According to the configuration, in the generation of the second operation mode information, when the determination is made that the second time point is not present, the first operation mode information is generated based on the log information before the first time point, and the second operation mode information is generated from the generated first operation mode information based on the correction function.

Accordingly, when the first device deteriorates without a sign, the second operation mode information can be generated from the first operation mode information generated based on log information before the first time point where the first device deteriorated, thereby enabling control of the second device further according to user's preference by using the second operation mode information.

The above device control method may be also configured such that the log information includes a sensor value, and the first operation mode information includes a plurality of pieces of the first operation mode information generated at every predetermined period, and the device control method further includes: detecting a first time point where abnormality of the sensor value has occurred in the past; determining whether or not a second time point is present where the first operation mode information generated before the first time point has changed from immediately preceding first operation mode information among the plurality of pieces of first operation mode information; and determining whether or not a use condition of the first device has changed at the second time point when the determination is made that the second time point is present, in which when the determination is made that the use condition of the first device has not changed at the second time point, the generation of the second operation mode information includes extracting the first operation mode information generated before the second time point from among the plurality of pieces of first operation mode information and generating the second operation mode information from the extracted first operation mode information based on the correction function.

According to the configuration, the log information includes a sensor value. The first operation mode information includes a plurality of pieces of the first operation mode information generated at every predetermined period. A first time point where abnormality of the sensor value has occurred in the past is detected. Determination is made as to whether or not a second time point is present where the first operation mode information generated before the first time point has changed from immediately preceding first operation mode information among the plurality of pieces of first operation mode information. When the determination is made that the second time point is present, determination is made as to whether or not a use condition of the first device has changed at the second time point. In the generation of the second operation mode information, when the determination is made that the use condition of the first device has not changed at the second time point, the first operation mode information generated before the second time point is extracted from among the plurality of pieces of first operation mode information, and the second operation mode information is generated from the extracted first operation mode information based on the correction function.

Accordingly, in a case where a change of the first operation mode information from immediately preceding first operation mode information at the second time point is caused by a change of the use condition of the first device, the determination can be made that the second time point is not a time point where a sign of deterioration of the first device appears. In a case where a change of the first operation mode information from immediately preceding first operation mode information at the second time point is not caused by a change of the use condition of the first device, the determination can be made that the second time point is a time point where a sign of deterioration of the first device appears. Therefore, in a case where the determination is made that the use condition of the first device has not changed at the second time point, the second operation mode information is generated from the first operation mode information generated before the second time point where a sign of deterioration of the first device appears. Thus, the second device can be controlled according to user's preference by using the second operation mode information.

The above device control method may be also configured such that when the determination is made that the use condition of the first device has changed at the second time point, the generation of the second operation mode information includes extracting the first operation mode information generated before the first time point from among the plurality of pieces of first operation mode information and generating the second operation mode information from the extracted first operation mode information based on the correction function.

According to the configuration, in the generation of the second operation mode information, when the determination is made that the use condition of the first device has changed at the second time point, the first operation mode information generated before the first time point is extracted from among the plurality of pieces of first operation mode information, and the second operation mode information is generated from the extracted first operation mode information based on the correction function.

Accordingly, in a case where the determination is made that the use condition of the first device has changed at the second time point, the second operation mode information is generated from the first operation mode information generated before the first time point where the first device deteriorated. Thus, the second device can be controlled according to user's preference by using the second operation mode information.

The above device control method may be also configured such that when the determination is made that the use condition of the first device has changed at the second time point, the generation of the second operation mode information includes generating the first operation mode information based on the log information before the first time point and generating the second operation mode information from the generated first operation mode information based on the correction function.

According to the configuration, in the generation of the second operation mode information, when the determination is made that the use condition of the first device has changed at the second time point, the first operation mode information is generated based on the log information before the first time point, and the second operation mode information is generated from the generated first operation mode information based on the correction function.

Accordingly, when the determination is made that the use condition of the first device has changed at the second time point, the second operation mode information is generated from the first operation mode information based on the log information before the first time point where the first device deteriorated. Thus, the second device can be controlled according to user's preference by using the second operation mode information.

The above device control method may be also configured such that, in determining whether or not the second time point is present, the determination is made that the second time point is present when a degree of similarity between the first operation mode information generated before the first time point and first operation mode information immediately preceding the first operation mode information is lower than a predetermined value.

According to the configuration, in determining whether or not the second time point is present, the determination is made that the second time point is present when a degree of similarity between the first operation mode information generated before the first time point and first operation mode information immediately preceding the first operation mode information is lower than a predetermined value.

Accordingly, it is possible to detect a second time point with ease where the first operation mode information generated before the first time point has changed from immediately preceding first operation mode information.

The above device control method may be also configured such that the device control apparatus is connected to a mobile terminal so as to be communicable, the mobile terminal being associated with the first device and the second device, and the device control method further includes transmitting, to the mobile terminal, notification information for notifying a user to cause the second device to operate using the second operation mode information upon transmission of the second operation mode information to the second device.

According to the configuration, the device control apparatus is connected to a mobile terminal so as to be communicable, the mobile terminal being associated with the first device and the second device. Upon transmission of the second operation mode information to the second device, notification information for notifying a user to cause the second device to operate using the second operation mode information is transmitted to the mobile terminal.

Accordingly, it is possible to notify a user to operate the second device by using the second operation mode information.

The above device control method may be also configured such that the mobile terminal displays the notification information transmitted by the device control apparatus.

According to the configuration, since the notification information transmitted by the device control apparatus is displayed on the mobile terminal, a user is allowed to visually check operating the second device by using the second operation mode information.

A device control apparatus according to another aspect of the present disclosure is a device control apparatus which controls a second device connected in place of a first device, the apparatus including: a processor; a memory; and a communication unit, in which the memory stores first performance information indicative of performance of the first device and second performance information indicative of performance of the second device, the processor generates a correction function based on a difference between the first performance information and the second performance information, and generates, from first operation mode information for causing the first device to operate by first setting, the first operation mode information being generated based on log information of the first device, second operation mode information for causing the second device to operate by second setting corresponding to the first setting based on the correction function, and the communication unit transmits the second operation mode information to the second device.

According to the configuration, the memory stores first performance information indicative of performance of the first device and second performance information indicative of performance of the second device. Then, the processor generates a correction function based on a difference between the first performance information and the second performance information, and generates, from first operation mode information for causing the first device to operate by first setting, the first operation mode information being generated based on log information of the first device, second operation mode information for causing the second device to operate by second setting corresponding to the first setting based on the correction function. The communication unit transmits the second operation mode information to the second device.

Accordingly, based on a correction function generated based on a difference between the first performance information and the second performance information, the second operation mode information for causing the second device to operate by the second setting corresponding to the first setting is generated from the first operation mode information for causing the first device to operate by the first setting, the first operation mode information being generated based on log information of the first device, setting contents of the first device can be ported to the second device while taking into consideration a difference between the performance of the first device and the performance of the second device at the time of replacement of the first device by the second device. Thus, an optimum environment according to user's preference can be provided.

A device control system according to another aspect of the present disclosure includes: a second device connected in place of a first device; and a device control apparatus which controls the second device, in which the device control apparatus acquires first performance information indicative of performance of the first device and second performance information indicative of performance of the second device, generates a correction function based on a difference between the first performance information and the second performance information, generates, from first operation mode information for causing the first device to operate by first setting, the first operation mode information being generated based on log information of the first device, second operation mode information for causing the second device to operate by second setting corresponding to the first setting based on the correction function, and transmits the second operation mode information to the second device, and the second device receives the second operation mode information transmitted by the device control apparatus, and controls operation of the second device by using the second operation mode information.

According to the configuration, in the device control apparatus, first performance information indicative of performance of the first device and second performance information indicative of performance of the second device are acquired. A correction function is generated based on a difference between the first performance information and the second performance information, and from first operation mode information for causing the first device to operate by first setting, the first operation mode information being generated based on log information of the first device, second operation mode information for causing the second device to operate by second setting corresponding to the first setting is generated based on the correction function. The second operation mode information is transmitted to the second device. In the second device, the second operation mode information transmitted by the device control apparatus is received. Operation of the second device is controlled by using the second operation mode information.

Accordingly, based on a correction function generated based on a difference between the first performance information and the second performance information, the second operation mode information for causing the second device to operate by the second setting corresponding to the first setting is generated from the first operation mode information for causing the first device to operate by the first setting, the first operation mode information being generated based on log information of the first device, setting contents of the first device can be ported to the second device while taking into consideration a difference between the performance of the first device and the performance of the second device at the time of replacement of the first device by the second device. Thus, an optimum environment according to user's preference can be provided.

An embodiment of the present disclosure will be described with reference to the accompanying drawings in the following. The following embodiment is one example of implementation of the present disclosure and does not limit a technical range of the present disclosure.

Embodiment

First, a device control system according to the present disclosure will be described with reference to the drawings.

FIG. 1 is a diagram showing an overall configuration of the device control system in an embodiment of the present disclosure. A device control system 10 includes a server 100, a first device 200, a second device 300, and a mobile terminal 400. Further, the device control system 10 includes a first operation device 500 and a second operation device 600 which remote-controls the first device 200 and the second device 300, respectively.

The first device 200, the second device 300, and the mobile terminal 400 are connected with the server 100 to be communicable via a network 20. The network 20 is, for example, the Internet.

Although in the present embodiment, the first device 200 and the second device 300 are, for example, air conditioners, these devices are examples only and may be home appliances such as a washing machine, a rice cooker, an air purifier or a dish washer, or a device other than home appliances.

In the present embodiment, a user first uses the first device 200. After several years, the user newly purchases the second device 300 for some reason and sets up the second device 300 in place of the first device 200. On this occasion, the first device 200 is discarded or moved to other place.

First, when starting to use the first device 200, the user uses the mobile terminal 400 to register information about the first device 200 in the server 100.

Next, the user causes the first device 200 to operate in an automatic mode. Then, the user operates the first device 200 using the first operation device 500 or the mobile terminal 400 as required to change setting. In a case of operation using the mobile terminal 400, the user sets control contents at the mobile terminal 400. The control contents are transmitted to the first device 200 via the server 100.

When a state change due to user's operation occurs as described above, the first device 200 transmits a state change notification as an operation history of the device to the server 100. Additionally, the first device 200 transmits a periodic state notification of the first device 200 to the server 100 at every fixed period, for example, every five minutes.

The server 100 updates a function for use in the automatic mode (hereinafter, referred to as "automatic mode function") according to user's preference based on the state change notification or the periodic state notification received from the first device 200 and transmits the same to the first device 200. The first device 200 updates the existing automatic mode function to a latest automatic mode function received from the server 100. An updating cycle may be one week or other cycle.

Then, after a lapse of several years after the user started using the first device 200, the user sets up the second device 300 at the same place of the first device 200 in place of the first device 200 for some reason.

At this time, the user registers information about the second device 300 in the server 100 and starts using the second device 300. The user conducts operation for porting the automatic mode function used in the first device 200 to the second device 300 according to a device registration screen.

Here, examples of control in the automatic mode include control of automatically setting a set temperature, a wind volume, and a wind direction based on sensor information such as an outside temperature or a room temperature, and when the room temperature becomes the set temperature, weakening a wind volume, or when the outside temperature changes, following the change, automatically changing the set temperature.

In the following, description will be made of operation of the device control system 10 in which the first device 200 is replaced by the second device 300 and an automatic mode function of the first device 200 is corrected to be usable also in the automatic mode of the second device 300.

Figure 2:
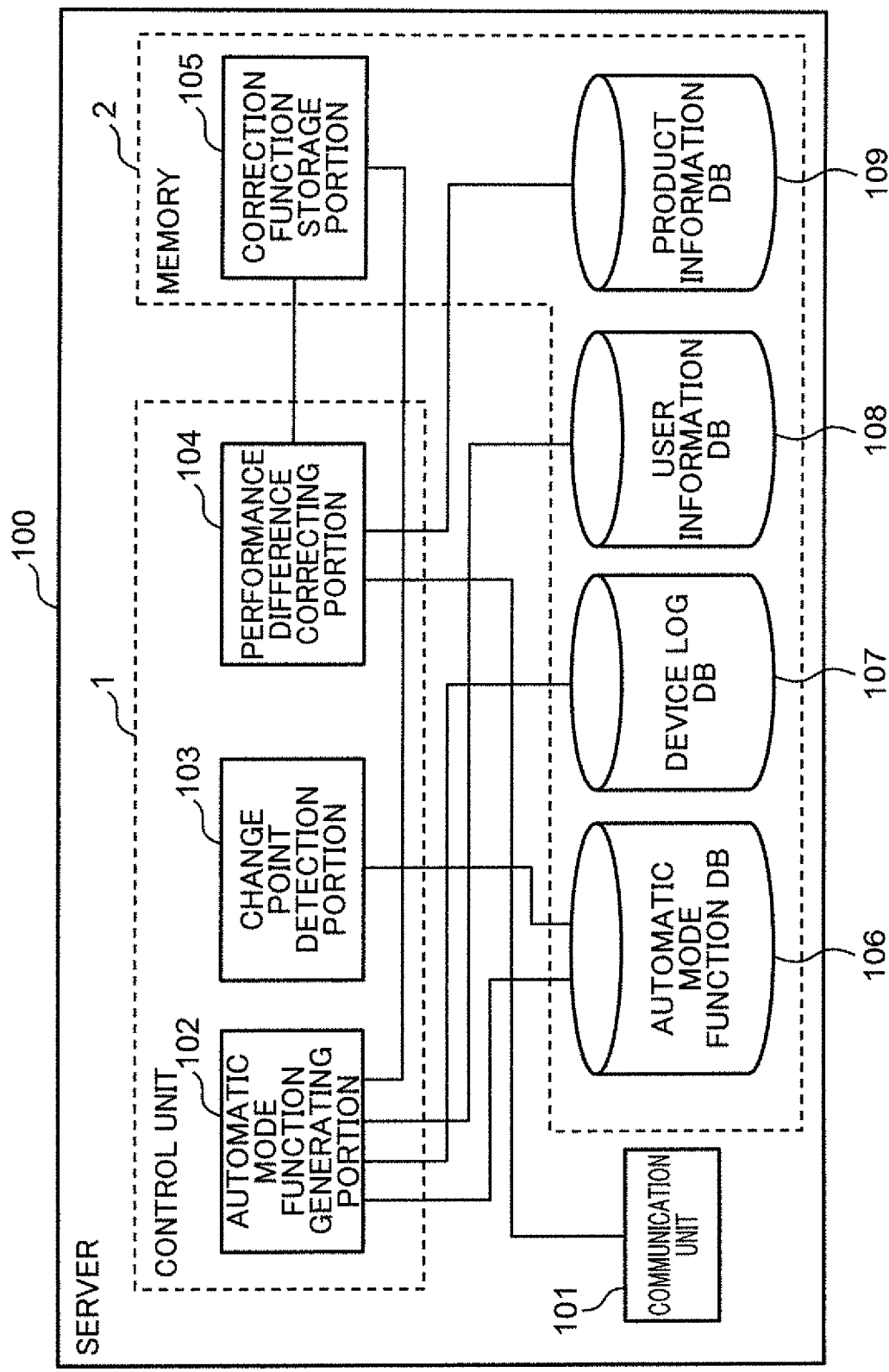
FIG. 2 is a diagram showing a configuration of a server in the device control system of the present embodiment.

FIG. 2 is a diagram showing a configuration of the server in the device control system of the present embodiment.

The server 100 includes a control unit 1, a memory 2, and a communication unit 101. The server 100 is one example of the device control apparatus. The control unit 1 includes an automatic mode function generating portion 102, a change point detection portion 103, and a performance difference correcting portion 104. The memory 2 includes a correction function storage portion 105, an automatic mode function DB (data base) 106, a device log DB 107, a user information DB 108, and a product information DB 109.

The automatic mode function generating portion 102, the change point detection portion 103, and the performance difference correcting portion 104 are mounted by provision of these functions in the control unit 1 in the server 100. The control unit 1 is a processor such as, for example, a CPU (central processing unit) or a microcontroller. The correction function storage portion 105, the automatic mode function DB 106, the device log DB 107, the user information DB 108, and the product information DB 109 are mounted by provision of these functions in the memory 2 in the server 100. Here, the memory 2 is, for example, a rewritable non-volatile storage device.

The communication unit 101 receives registration information of the first device 200 from the mobile terminal 400 at the time of registration of the first device 200. The registration information includes information about a user such as a user ID, a device ID, and a set-up place, and information about the first device 200.

When the user starts using the first device 200, the communication unit 101 receives the state change notification or the periodic state notification of the first device 200 from the first device 200. The communication unit 101 receives control contents from the mobile terminal 400 and transmits the received control contents to the first device 200. The control contents include setting information such as ON operation, OFF operation, a temperature, a wind volume, and a wind direction.

Further, the communication unit 101 transmits the automatic mode function generated in the server 100 to the first device 200.

The automatic mode function generating portion 102 generates an automatic mode function satisfying user's preference from an initial automatic mode function stored in advance in the first device 200 based on the state change notification or the periodic state notification received from the first device 200. Then, the automatic mode function generating portion 102 adds the generated automatic mode function to a table in the automatic mode function DB 106, the table indicating a device ID of the first device 200. The automatic mode function generating portion 102 outputs the generated automatic mode function to the communication unit 101, and the communication unit 101 transmits the automatic mode function to the first device 200. Details of the table in the automatic mode function DB 106 will be detailed in the description of the automatic mode function DB 106.

When porting the automatic mode function of the first device 200 to the second device 300, the automatic mode function generating portion 102 extracts, from the device log DB 107, the operation history of the first device 200 from the time of registration of the first device 200 until a time point where deterioration of the first device 200 is estimated to have occurred, the time being input from the change point detection portion 103, and generates an automatic mode function of the second device 300 by using the extracted operation history.

Figure 3:
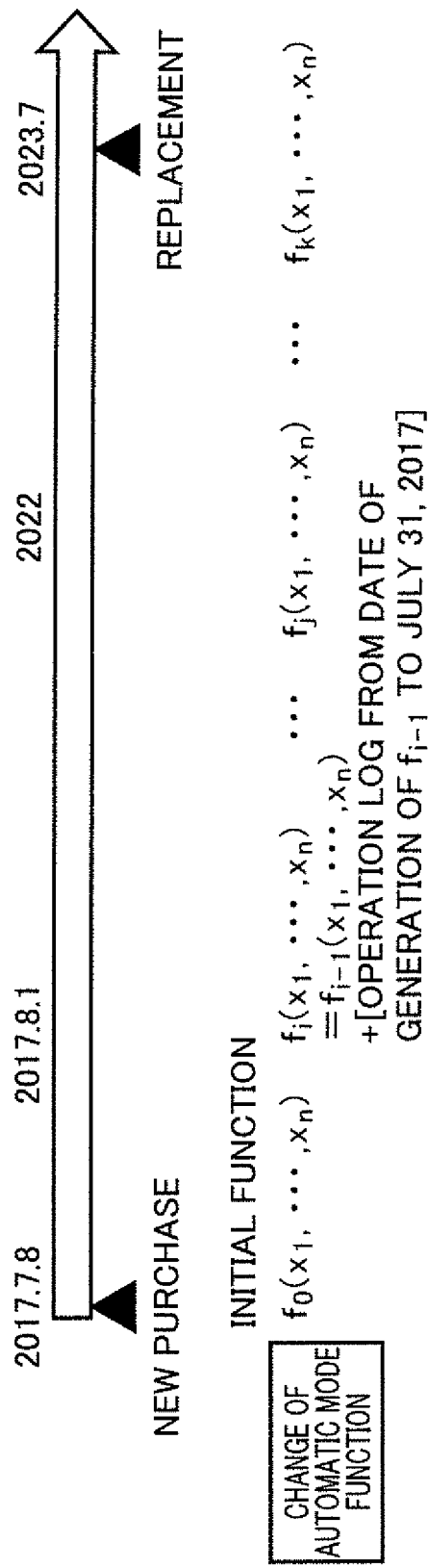
FIG. 3 is a diagram for describing an example for generating an automatic mode function in the present embodiment.

FIG. 3 is a diagram for describing an example for generating an automatic mode function in the present embodiment. Description will be herein made of a case where a user newly purchases the first device 200 on Jul. 8, 2017 and replaces the device with the second device 300 in July 2023. Although for simplicity, description will be made using an example where a function representing the automatic mode is regression curve, a function representing the automatic mode is not limited to a regression curve but may be a higher dimensional function. Representing an automatic mode function in high dimension has more parameters expressing a function to enable more detailed customization and control. While in the present embodiment, the automatic mode is expressed by a function, the present disclosure is not particularly limited thereto.

At a time point where the first device 200 is newly purchased, a function expressed by Formula (1) below is set as an initial function.

$$f_0(x_1, \ldots, x_n) \tag{1}$$

The initial function is designed to generally make people feel comfortable. Then, the automatic mode function generating portion 102 updates the initial function stored in advance in the first device 200 according to user's preference based on the state change notification or the periodic state notification received from the first device 200, thereby updating the function expressed by Formula (2) below.

$$f_i(x_1, \ldots, x_n) \tag{2}$$

At the time point of Aug. 1, 2017, the automatic mode function generating portion 102 calculates Formula (2) based on Formula (3) below and an operation history from the day of generation of Formula (3) until Jul. 31, 2017.

$$f_{i-1}(x_1, \ldots, x_n) \tag{3}$$

The automatic mode function generating portion 102 makes fine adjustment of the initial function based on operation history and sensor information of each year and each season. The automatic mode function is updated once a week, for example. When no history of user's operation is present during one week, the current automatic mode function is adopted.

Figure 4:
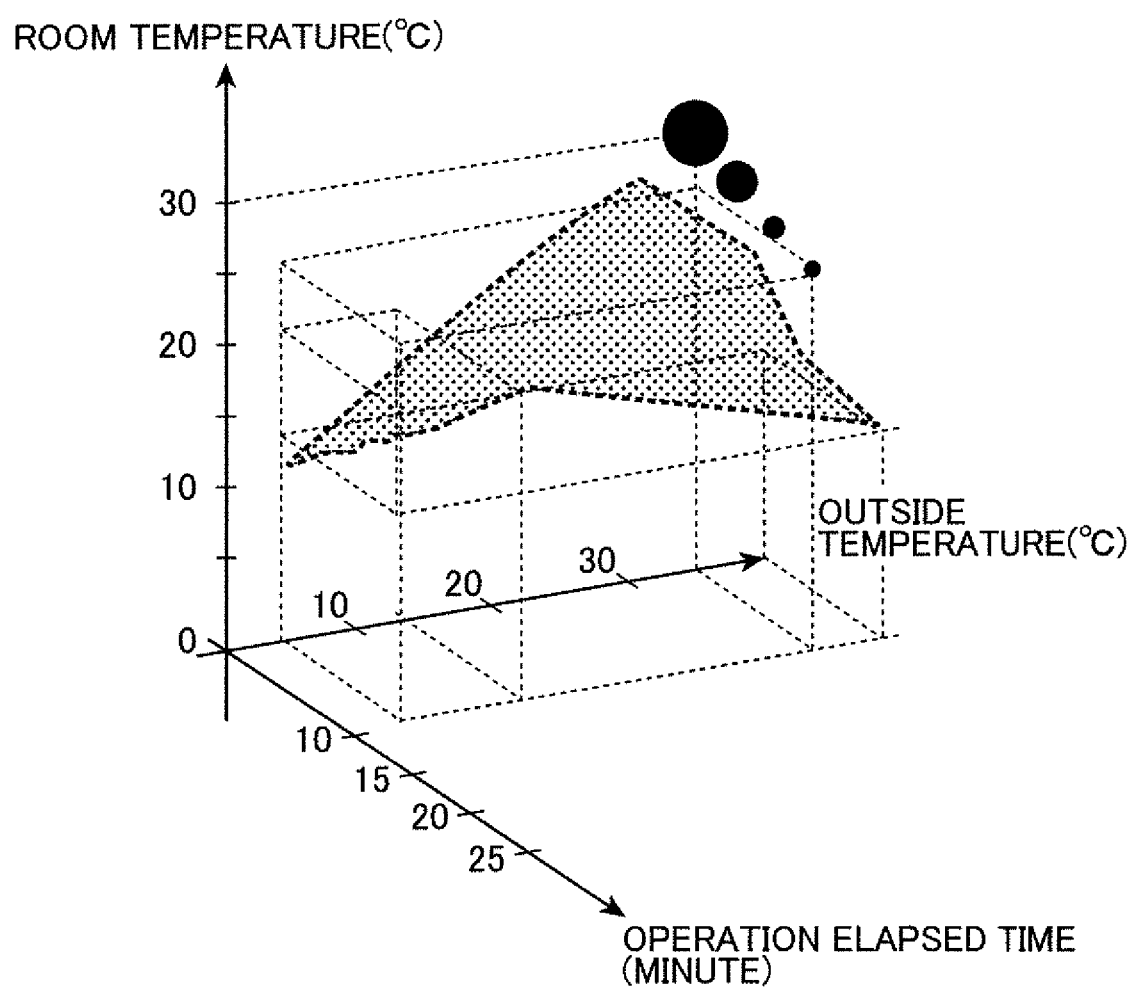
FIG. 4 is a diagram showing one example of the automatic mode function generated by an automatic mode function generating portion in the present embodiment.

FIG. 4 is a diagram showing one example of the automatic mode function generated by the automatic mode function generating portion in the present embodiment. The function shown in FIG. 4 is expressed by a regression curved surface. In a case where time series changes in a room temperature, an outside temperature, and an operation elapsed time are plotted, when the season is winter, immediately after turning-on of an air conditioner, the outside temperature and the room temperature are both low, and the room temperature increases with the lapse of time. When the season is summer, immediately after turning-on of the air conditioner, the outside temperature and the room temperature are both high, and the room temperature decreases with the lapse of time. Further, together with the regression curved surface, a difference from a set temperature may be expressed as a size of a dot. Additionally, while an actual temperature change is plotted in the above description, the axis may be set by other item such as an actual change of a set temperature, or a visualized function may be expressed by a higher dimensional figure in which a variable is expressed by color or a thickness.

When porting the automatic mode function of the first device 200 to the second device 300, the change point detection portion 103 detects a time point where deterioration of the first device 200 is estimated to have occurred, and a time point where a sign of deterioration of the first device 200 appears. When detecting the time point where deterioration is estimated to have occurred, the change point detection portion 103 extracts, from the automatic mode function DB 106, a latest automatic mode function before the time point where the deterioration is estimated to have occurred, and outputs the extracted automatic mode function to the performance difference correcting portion 104. At this time, the change point detection portion 103 may output information indicative of the time point where deterioration is estimated to have occurred to the automatic mode function generating portion 102.

The performance difference correcting portion 104 generates a correction function for correcting a performance difference between devices of each combination of a plurality of devices stored in the product information DB 109. The performance difference correcting portion 104 acquires a plurality of pieces of performance information indicative of each performance of the plurality of devices including the first device 200 and the second device 300. The performance difference correcting portion 104 generates a plurality of correction functions based on differences in performance information of each combination of the plurality of devices.

The performance difference correcting portion 104 acquires first performance information indicative of performance of the first device 200 and second performance information indicative of performance of the second device 300. The performance difference correcting portion 104 generates a correction function based on a difference between the first performance information and the second performance information. The performance difference correcting portion 104 extracts a correction function corresponding to a combination between the first device 200 and the second device 300 from among the plurality of correction functions.

FIG. 5 is a diagram for describing generation of a correction function for correcting a difference in performance due to a wind volume in a case where the first device and the second device are air conditioners. The first device 200 is an air conditioner of a 2017 model, A series, and the second device 300 is air conditioner of a 2023 model, A series. As to performance of the first device 200 and performance of the second device 300, a wind volume corresponding to "strong wind" in the 2017 model is changed and designed to be the same as a wind volume corresponding to "slightly strong wind" in the 2023 model (a numerical value level of the wind volume is 5) by improvement in performance such as an increase in wind circulation efficiency. For the same reason for performance improvement, the number of variations of a wind volume is increased (numerical value levels of the wind volume are 1 to 4) to enable weaker wind volume setting and more detailed wind volume setting.

FIG. 6 is a diagram for describing a difference in control due to a difference between performance of the first device and performance of the second device. In FIG. 6, in both a case of controlling the first device 200 and a case of controlling the second device 300, a temporal change of an outside temperature is the same and a temporal change of a set temperature is also the same. In this case, in a period where control is conducted with the "strong" wind volume in the first device 200 of the 2017 model, A series, control is conducted with the "slightly strong" wind volume in the second device 300 of the 2023 model, A series. The performance difference correcting portion 104 generates a correction function so as to absorb a difference between performance of the second device 300 and performance of the first device 200.

In the following, description will be made of an example of generating a correction function for correcting a difference between the performance of the first device 200 of the 2017 model, A series for 14 tatami mats and the performance of the second device 300 of the 2023 model, A series for 14 tatami mats.

A function for each set wind volume of the first device 200 of the 2017 model, A series for 14 tatami mats is expressed by Formula (4) below, and a function for each set wind volume of the second device 300 of the 2023 model, A series for 14 tatami mats is expressed by Formula (5) below.

$$\begin{cases} y = g_{17A14\_2}(x_1, x_2, \ldots, x_n) \\ y = g_{17A14\_3}(x_1, x_2, \ldots, x_n) \\ y = g_{17A14\_4}(x_1, x_2, \ldots, x_n) \\ y = g_{17A14\_5}(x_1, x_2, \ldots, x_n) \\ y = g_{17A14\_7}(x_1, x_2, \ldots, x_n) \end{cases} \quad (4)$$

$$\begin{cases} y = g_{23A14\_1}(x_1, x_2, \ldots, x_n) \\ y = g_{23A14\_2}(x_1, x_2, \ldots, x_n) \\ y = g_{23A14\_3}(x_1, x_2, \ldots, x_n) \\ y = g_{23A14\_5}(x_1, x_2, \ldots, x_n) \\ y = g_{23A14\_6}(x_1, x_2, \ldots, x_n) \\ y = g_{23A14\_7}(x_1, x_2, \ldots, x_n) \end{cases} \quad (5)$$

At this time, a formula for converting Formula (4) to Formula (5) is expressed as Formula (6) below.

$$g_{23A14\_j}(x_1, x_2, \ldots, x_n) = \alpha_{17A23A}(x_1, x_2, \ldots, x_n) \cdot g_{17A14\_j}(x_1, x_2, \ldots, x_n) \quad (6)$$

Then, the correction function is expressed by Formula (7) below.

$$\alpha_{ij}(x_1, x_2, \ldots, x_n) \quad (7)$$

After generating a correction function, the performance difference correcting portion 104 stores the generated correction function in the correction function storage portion 105.

At the time of porting the automatic mode function of the first device 200 to the second device 300, the automatic mode function generating portion 102 also extracts a correction function for correcting a difference between the performance of the first device 200 and the performance of the second device 300 from the correction function storage portion 105 and corrects the automatic mode function of the first device 200 based on the extracted correction function.

Based on the correction function generated by the performance difference correcting portion 104, the automatic mode function generating portion 102 generates second operation mode information for causing the second device 300 to operate in second setting corresponding to first setting from first operation mode information for causing the first device 200 to operate in the first setting, the first operation mode information being generated based on log information of the first device 200. The first operation mode information is a first automatic mode function and the second operation mode information is a second automatic mode function. The communication unit 101 transmits the second automatic mode function (the second operation mode information) generated by the automatic mode function generating portion 102 to the second device 300.

The change point detection portion 103 detects a first time point where abnormality of a sensor value measured by the first device 200 has occurred in the past. The automatic mode function generating portion 102 extracts a first automatic mode function generated before the first time point from among the plurality of first automatic mode functions, and generates a second automatic mode function from the extracted first automatic mode function based on the correction function. The automatic mode function generating portion 102 may generate a first automatic mode function based on the log information of the first device 200 before the first time point, and generate a second automatic mode function from the generated first automatic mode function based on the correction function.

Further, the change point detection portion 103 may determine whether or not there is a second time point where a first automatic mode function generated before the first time point changes from an immediately preceding first automatic mode function among the plurality of first automatic mode functions. Then, when the determination is made that the second time point is present, the automatic mode function generating portion 102 may extract a first automatic mode function generated before the second time point from among the plurality of first automatic mode functions and generate a second automatic mode function from the extracted first automatic mode function based on the correction function.

When the determination is made that the second time point is not present, the automatic mode function generating portion 102 may extract a first automatic mode function generated before the first time point from among the plurality of first automatic mode functions, and generate a second automatic mode function from the extracted first automatic mode function based on the correction function. When the determination is made that the second time point is not present, the automatic mode function generating portion 102 may generate a first automatic mode function based on the log information of the first device 200 before the first time point, and generate a second automatic mode function from the generated first automatic mode function based on the correction function.

Further, when the determination is made that the second time point is present, the change point detection portion 103 may determine whether or not a use condition of the first device 200 has changed at the second time point. When the determination is made that the use condition of the first device 200 has not changed at the second time point, the automatic mode function generating portion 102 may extract a first automatic mode function generated before the second time point from among the plurality of first automatic mode functions, and generate a second automatic mode function from the extracted first automatic mode function based on the correction function.

When the determination is made that the use condition of the first device 200 has changed at the second time point, the automatic mode function generating portion 102 may extract a first automatic mode function generated before the first time point from among the plurality of first automatic mode functions, and generate a second automatic mode function from the extracted first automatic mode function based on the correction function. When the determination is made that the use condition of the first device 200 has changed at the second time point, the automatic mode function generating portion 102 may generate a first automatic mode function based on the log information of the first device 200 before the first time point, and generate a second automatic mode function from the generated first automatic mode function based on the correction function.

When similarity between the first automatic mode function generated before the first time point and the first automatic mode function immediately preceding first automatic mode function is lower than a predetermined value, the change point detection portion 103 determines that the second time point is present.

A correction function will be described in detail in description of the correction function storage portion 105.

The correction function storage portion 105 stores a correction function generated by the performance difference correcting portion 104. At the time of porting the automatic mode function of the first device 200 to the second device 300, the performance difference correcting portion 104 extracts a correction function with reference to the correction function storage portion 105.

FIG. 7 is a diagram showing one example of a table stored in the correction function storage portion in the present embodiment. The table stored in the correction function storage portion 105 is a correspondence table in which a plurality of devices and a plurality of devices are correlated with each other, and a correction function generated by the performance difference correcting portion 104 is expressed by Formula (8) below.

$$\alpha_{ij} \tag{8}$$

In FIG. 7, the device of the 2017 model, A series is represented as "17A" and the device of the 2023 model, A series is represented as "23A". For example, a correction function for correcting a difference between performance of a device (17A) of the 2017 model, A series and performance of a device (23A) of the 2023 model, A series is represented as Formula (9) below.

$$\alpha_{17A23A} \tag{9}$$

While FIG. 7 shows the correspondence table between models and series, a correspondence table of parameters indicating other performances of an air conditioner such as a room size may be created.

The automatic mode function DB 106 stores an automatic mode function generated by each device in the past together with the initial automatic mode function. The automatic mode function DB 106 stores the first operation mode information for causing the first device 200 to operate in the first setting. The first operation mode information is the first automatic mode function. The first automatic mode function is generated based on the log information of the first device 200.

FIG. 8 is a diagram showing one example of the table stored in the automatic mode function DB in the present embodiment, and FIG. 9 is a diagram showing another example of the table stored in the automatic mode function DB in the present embodiment. The automatic mode function DB 106 stores a device ID for identifying a device, an update date of an automatic mode function, and the automatic mode function in association with each other. As shown in FIG. 9, the automatic mode function DB 106 may also store, in association with each other, a device ID, a latest update date of an automatic mode function, and a file path for specifying a file in which history of an automatic mode function corresponding to the device ID is stored. The history of the automatic mode function is stored, in a file format, at a predetermined position in the memory 2 specified by the file path. An automatic mode function storing method is not limited thereto.

The device log DB 107 stores a state change notification and a periodic state notification received from each device. The device log DB 107 stores log information transmitted by the first device 200 or the second device 300.

FIG. 10 is a diagram showing one example of a table stored in the device log DB in the present embodiment. The device log DB 107 includes time, ON/OFF operation, a control mode indicating whether control is conducted in the automatic mode or a manual mode, a set wind direction, a set wind volume, a set temperature, an operation mode indicating any of cooling operation, heating operation and dehumidifying operation in the automatic mode, a set wind direction in the automatic mode, a set wind volume in the automatic mode, a set temperature in the automatic mode, an outside temperature, a room temperature, a humidity, an operation mode change flag indicating whether or not the operation mode has been changed, a wind direction change flag indicating whether or not a wind direction has been changed, a wind volume change flag indicating whether or not a wind volume has been changed, a temperature change flag indicating whether or not a temperature has been changed, a user operation flag indicating whether or not operation has been changed by a user, and a remote operation flag indicating whether or not remote operation has been conducted. Outside temperature, room temperature and humidity are sensor values measured by a sensor 205 of the first device 200.

For example, when operation of the air conditioner is started in the automatic mode at 18:00:15 on Jul. 3, 2017, first, the air conditioner is operated in the automatic mode. Then, the user changes the wind direction downward at 18:30:00, as well as changing the wind volume to be weak.

As a result, a row is added to the device log DB 107, in which time is 18:30:00, the user operation flag is "1", and contents of the wind direction and the wind volume are changed.

Log information included in the state change notification or the periodic state notification may include sensor values of various sensors provided inside or outside of the device, such as a piping temperature, a heat sensor value, and a human sensor value other than those described above. The sensor value may be measured by a sensor provided outside of the first device 200.

The user information DB 108 stores information about a device owned by a user, and attribute information of the user input from a mobile terminal or a terminal enabling a browser to be viewed.

FIG. 11 is a diagram showing one example of a table stored in the user information DB in the present embodiment. The user information DB 108 includes a user ID for identifying a user, sex, date of birth, a device ID, a product number of a device, date of purchase, and a set-up place. The user information DB 108 stores, for example, that a user with a user ID of "123" is a male born on Jan. 31, 1977, a device owned by the user has a device ID of "aaa", a product number of "17AAxxx", date of purchase of Jul. 8, 2017, and is set up in a living room. User's attribute information may include a household member or the like and is not limited thereto.

The product information DB 109 stores information about a product of a device. The product information DB 109 stores the first performance information indicative of performance of the first device 200 and the second performance information indicative of performance of the second device 300.

FIG. 12 is a diagram showing one example of a table stored in the product information DB in the present embodiment. The product information DB 109 includes a product number, a model (year), series, the number of tatami mats, and performance information. It can be found from the product information DB 109 shown in FIG. 12, for example, that a device with the product number of "17AAxxx" is a 2017 model and A series and applicable to an area of 14 tatami mats. When product information totaling all the home appliances is stored, the product information DB 109 may include an item indicative of a kind of a home appliance such as an air conditioner.

The performance information includes wind volume performance which associates a numerical value of a wind volume as a reference and a wind volume value of each device with each other. The wind volume performance is information indicating to which numerical value of a wind volume among seven stages of numerical values of a wind volume, a wind volume value of each device corresponds, for example, as shown in FIG. 5. The performance information is not limited to wind volume performance.

Next, a configuration of the first device 200 will be described.

Figure 13:
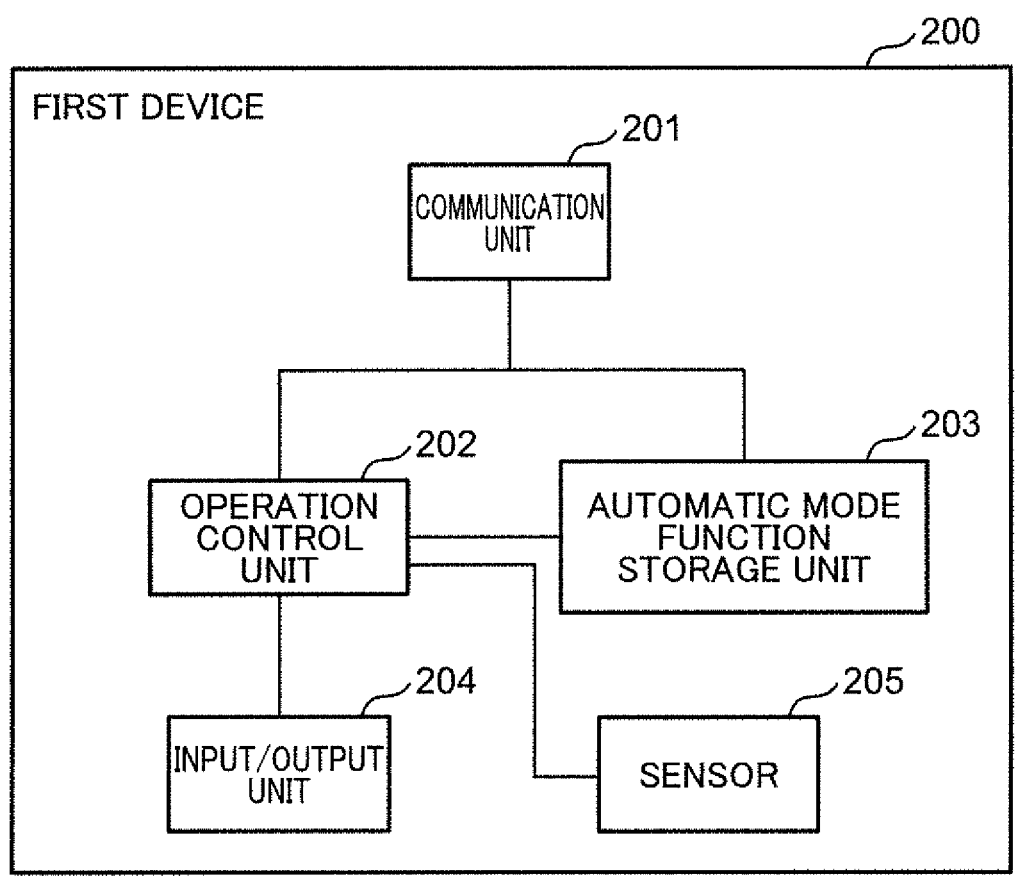
FIG. 13 is a diagram showing a configuration of the first device in the device control system of the present embodiment.
Figure 14:
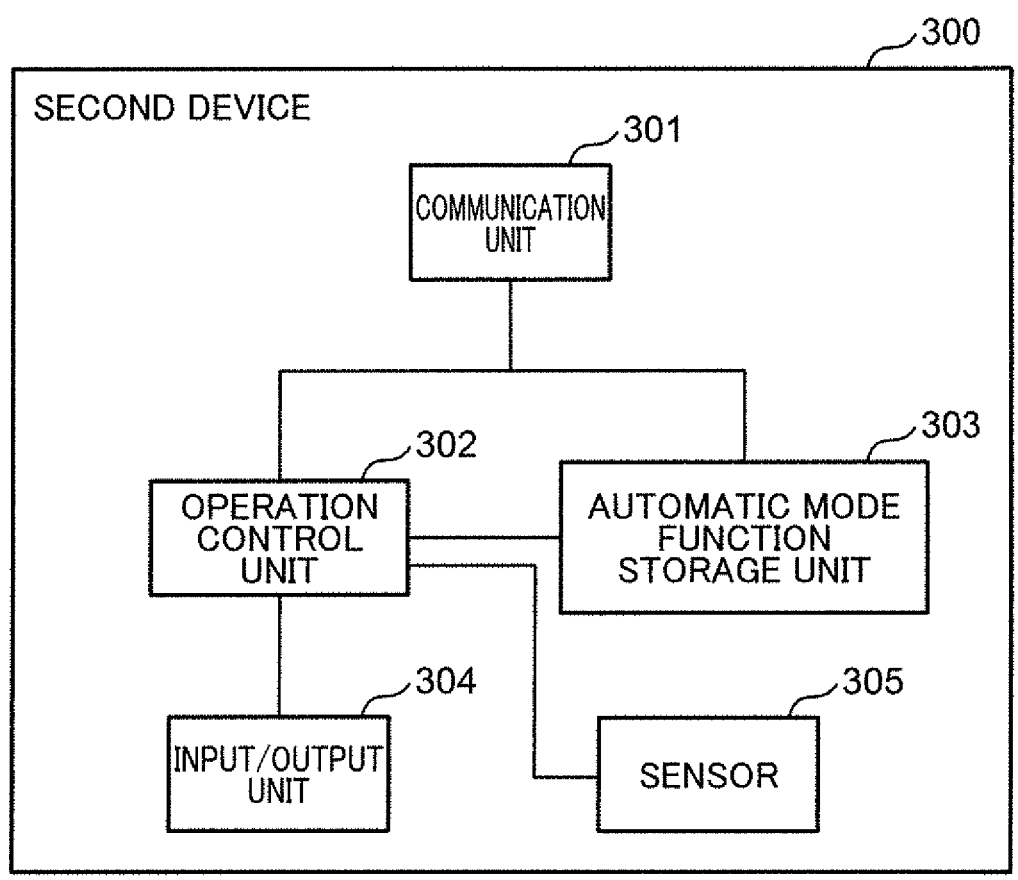
FIG. 14 is a diagram showing a configuration of the second device in the device control system of the present embodiment.

FIG. 13 is a diagram showing a configuration of the first device in the device control system of the present embodiment, and FIG. 14 is a diagram showing a configuration of the second device in the device control system of the present embodiment.

The first device 200 includes a communication unit 201, an operation control unit 202, an automatic mode function storage unit 203, an input/output unit 204, and a sensor 205.

The second device 300 includes a communication unit 301, an operation control unit 302, an automatic mode function storage unit 303, an input/output unit 304, and a sensor 305. Since the communication unit 301, the operation control unit 302, the automatic mode function storage unit 303, the input/output unit 304, and the sensor 305 of the second device 300 have the same configuration as those of the communication unit 201, the operation control unit 202, the automatic mode function storage unit 203, the input/output unit 204, and the sensor 205 of the first device 200 and operate in the same manner, no description will be made thereof.

The communication unit 201 transmits the state change notification or the periodic state notification of the first device 200 input from the operation control unit 202 to the server 100. The communication unit 201 also receives, from the server 100, control contents transmitted from the mobile terminal 400 by remote control and outputs the control contents to the operation control unit 202.

Further, the communication unit 201 receives an automatic mode function generated in the server 100 from the server 100 and stores the received automatic mode function in the automatic mode function storage unit 203.

The operation control unit 202 outputs control contents to the input/output unit 204 and controls operation of the first device 200 based on user's operation contents or control by an automatic mode function. The user's operation contents are input by the first operation device 500 or by the mobile terminal 400. When the operation contents are input by the first operation device 500, the operation control unit 202 acquires the operation contents from the input/output unit 204. When the operation contents are input by the mobile terminal 400, the operation control unit 202 acquires the operation contents from the communication unit 201. In the automatic mode control, the operation control unit 202 determines control contents using the automatic mode function stored in the automatic mode function storage unit 203, outputs the control contents to the input/output unit 204, and controls operation of the first device 200.

The operation control unit 202 is, for example, a processor such as a CPU or a microcontroller.

The automatic mode function storage unit 203 stores, as an initial function, an automatic mode function for controlling automatic operation of the first device 200. The automatic mode function storage unit 203 stores an automatic mode function for control which generally makes people feel comfortable. Every time the server 100 generates an automatic mode function, a latest automatic mode function received by the communication unit 201 is input from the communication unit 201 to the automatic mode function storage unit 203 and is overwritten.

Additionally, the automatic mode function storage unit 203 is referred to by the operation control unit 202 when the operation control unit 202 conducts control in the automatic mode.

The automatic mode function storage unit 203 is, for example, a rewritable non-volatile storage device.

The input/output unit 204 receives operation contents from the first operation device 500 and outputs the received operation contents to the operation control unit 202. The input/output unit 204 also outputs the control contents input from the operation control unit 202 to the outside of the first device 200. The input/output unit 204 receives the operation contents from the first operation device 500 through, for example, infrared communication, and transmits the control contents to the first operation device 500.

The sensor 205 includes various sensors provided in the first device 200 and measures, for example, an outside temperature, a room temperature, and a room humidity. The sensor 205 outputs the measured sensor values to the operation control unit 202. The sensor values measured by the sensor 205 are not limited to an outside temperature, a room temperature, and a room humidity.

Figure 15:
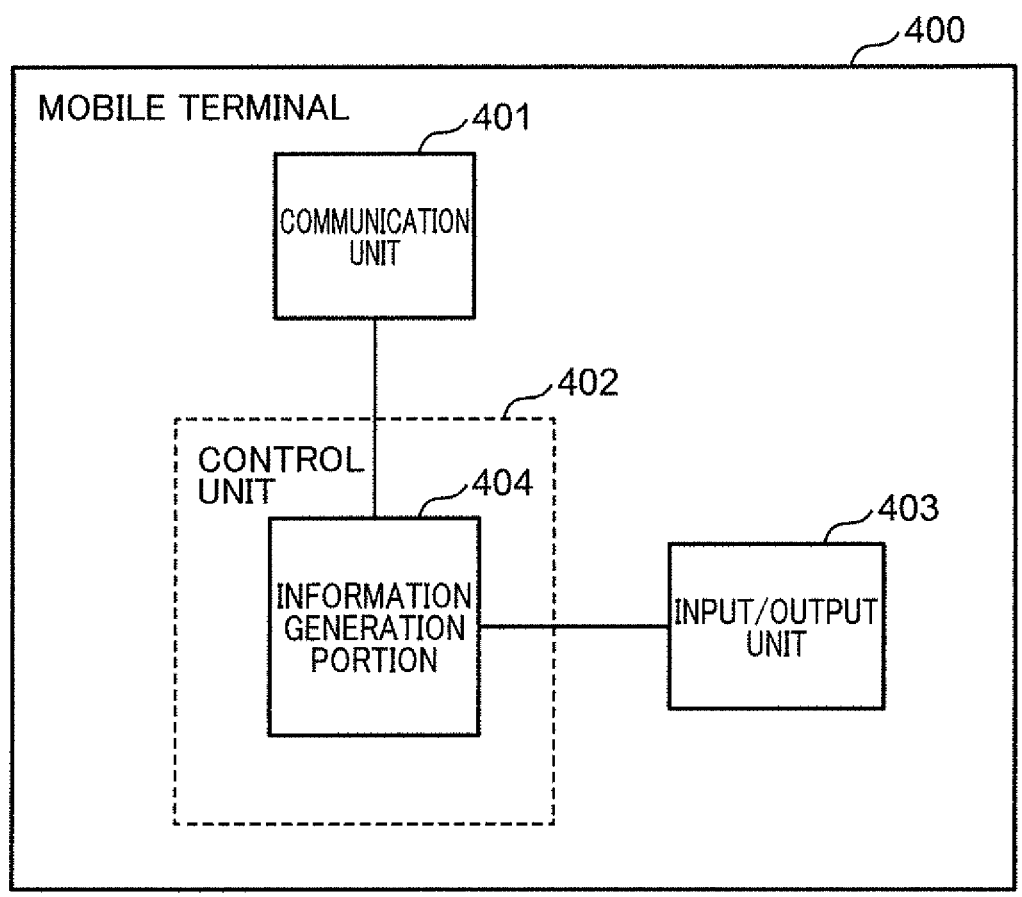
FIG. 15 is a diagram showing a configuration of a mobile terminal in the device control system of the present embodiment.

FIG. 15 is a diagram showing a configuration of the mobile terminal in the device control system of the present embodiment.

The mobile terminal 400 is, for example, a smartphone, a tablet computer, or a personal computer. The mobile terminal 400 includes a communication unit 401, a control unit 402, and an input/output unit 403. The control unit 402 is, for example, a processor such as a CPU, or a microcontroller, and includes an information generation portion 404. The server 100 is connected to the mobile terminal 400 so as to be communicable, the mobile terminal 400 being associated with the first device 200 and the second device 300.

The communication unit 401 transmits various pieces of information to the server 100 and receives various pieces of information from the server 100. At the time of device registration, the communication unit 401 acquires user information about a user and device information about the first device 200 from the information generation portion 404 and transmits the acquired information to the server 100. At the time of device control, the communication unit 401 acquires operation contents for operating the first device 200 from the information generation portion 404 and transmits the acquired operation contents to the server 100. At the time of device registration or device control, the communication unit 401 receives a feedback generated during communication with the server 100 from the server 100 and outputs the feedback to the information generation portion 404.

The information generation portion 404 outputs, to the communication unit 401, information input from the input/output unit 403 by user's operation. The information input from the input/output unit 403 at the time of device registration includes user information about a user and device information about the first device 200. The information input from the input/output unit 403 at the time of device control includes operation contents for the first device 200. The information generation portion 404 outputs, to the input/output unit 403, a feedback generated during communication with the server 100 and input from the communication unit 401.

The input/output unit 403 is, for example, a keyboard, a mouse, a touch panel or a liquid crystal display device.

The input/output unit 403 accepts information input by a user and outputs the input information to the information generation portion 404. At the time of device registration, the input/output unit 403 accepts user input of the user information about a user and the device information about the first device 200. At the time of device control, the input/output unit 403 accepts user input of operation contents to the first device 200. The input/output unit 403 also displays a feedback from the server 100 input from the information generation portion 404.

The communication unit 401 receives, from the server 100, notification information for notifying a user to operate the second device 300 using the automatic mode function (the second operation mode information). The input/output unit 403 displays the notification information received by the communication unit 401.

Next, operation of the device control system 10 will be described.

Operation of the device control system 10 includes device registration processing, automatic mode function generation processing, and automatic mode function porting processing. First, processing of the server 100 will be outlined with reference to FIG. 16.

Figure 16:
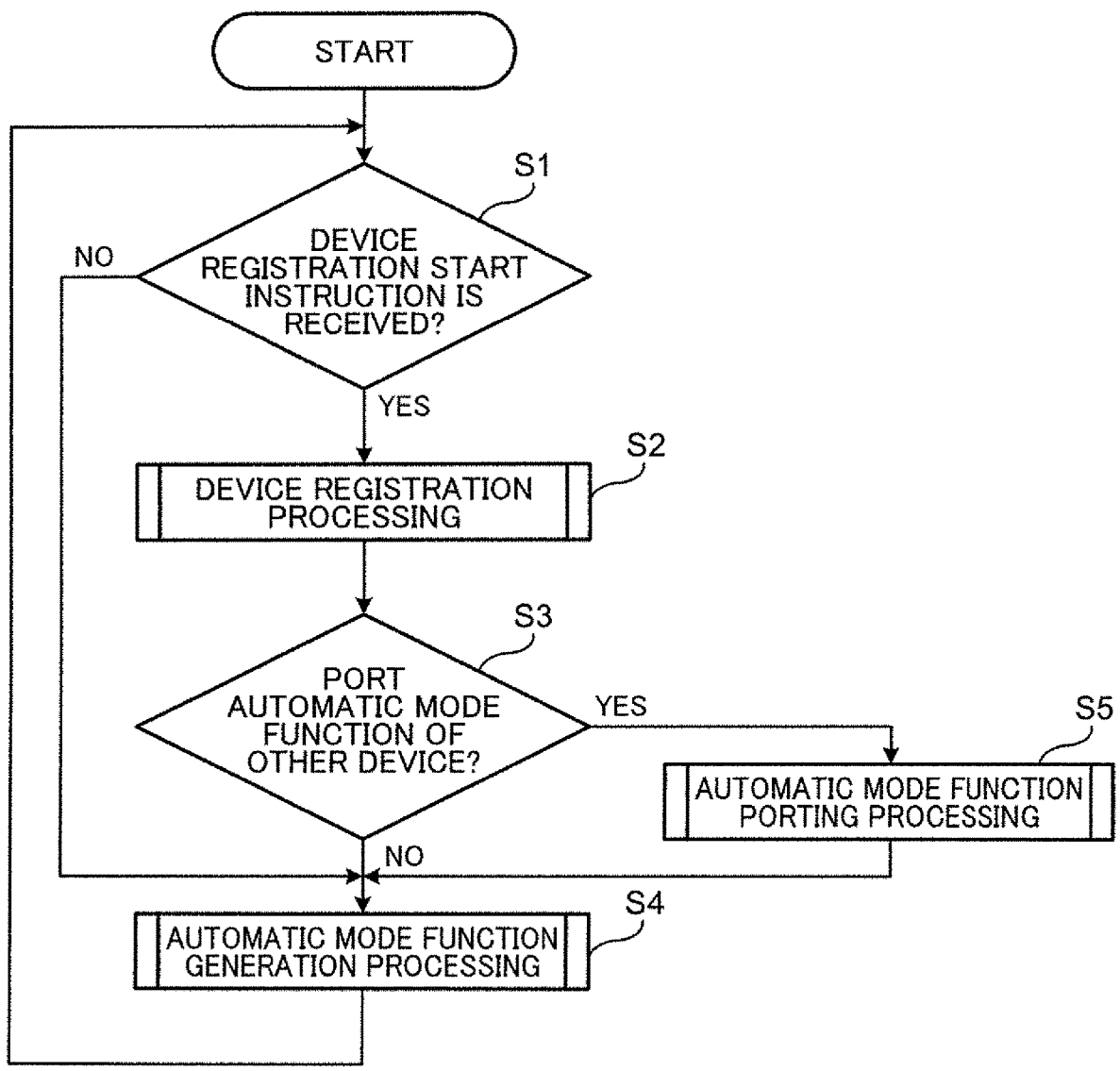
FIG. 16 is a flow chart showing one example of processing to be executed at the time of registering the second device.

FIG. 16 is a flow chart showing one example of processing to be executed at the time of registering the second device.

First, the communication unit 101 of the server 100 determines whether or not a device registration start instruction for starting registration of the second device 300 is received from the mobile terminal 400 (Step S1). Here, when determination is made that the device registration start instruction is not received (NO in Step S1), the processing proceeds to Step S4.

On the other hand, when the determination is made that the device registration start instruction is received (YES in Step S1), the control unit 1 conducts the device registration processing (Step S2). At the time of device registration, the mobile terminal 400 transmits the registration information input by the user to the server 100. The registration information includes information about a user such as a user ID, a device ID, and a set-up place, and information about the second device 300. The communication unit 101 of the server 100 receives the registration information transmitted by the mobile terminal, and stores the registration information in the user information DB 108. The device registration processing includes automatic mode function porting confirmation processing of confirming the user whether or not to succeed an automatic mode function of other device to the second device 300.

In the automatic mode function porting confirmation processing, the communication unit 101 transmits, to the mobile terminal 400, a confirmation request for confirming whether or not to port an automatic mode function of other device to the second device 300. The communication unit 401 of the mobile terminal 400 receives the confirmation request transmitted by the server 100. When the confirmation request is received, the input/output unit 403 displays a confirmation screen for confirming whether or not to port the automatic mode function of other device to the second device 300.

Figure 17:
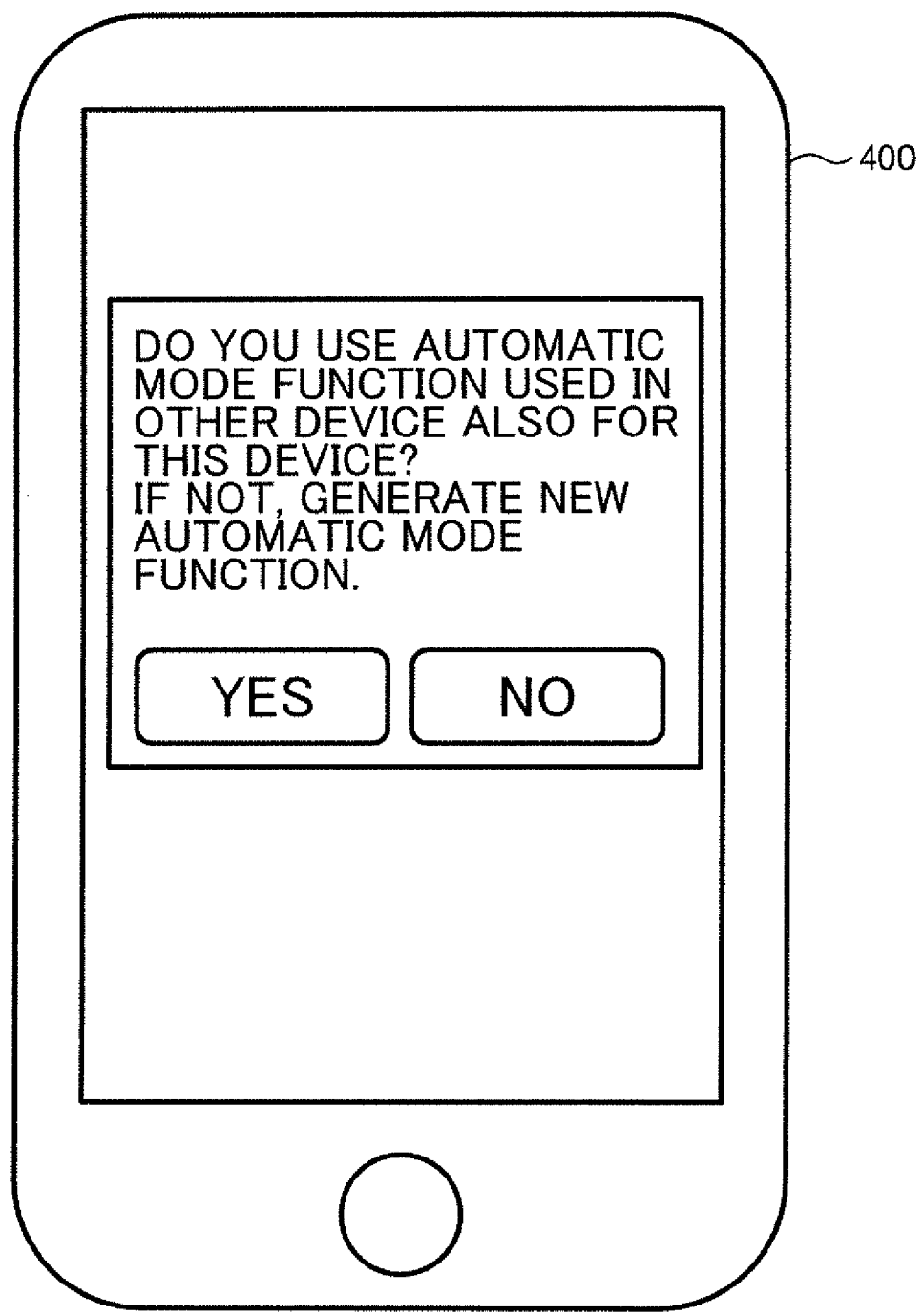
FIG. 17 is a view showing one example of a confirmation screen displayed on the mobile terminal in automatic mode function porting confirmation processing.

FIG. 17 is a view showing one example of the confirmation screen displayed on the mobile terminal in the automatic mode function porting confirmation processing.

The input/output unit 403 of the mobile terminal 400 displays the confirmation screen shown in FIG. 17. On the confirmation screen, user input indicating whether or not an automatic mode function used in other device is to be used in a newly set up device is accepted. The user selects whether or not to port the automatic mode function used in other device to the second device 300. The communication unit 401 of the mobile terminal 400 transmits, to the server 100, response information indicating whether or not to port the automatic mode function of other device to the second device 300. The communication unit 101 of the server 100 receives the response information transmitted by the mobile terminal 400.

The automatic mode function generating portion 102 of the server 100 determines whether or not to port the automatic mode function of other device to the second device 300 based on a response result of the automatic mode function porting confirmation processing (Step S3). When the determination is made herein that the automatic mode function of other device is not to be ported (NO in Step S3), the automatic mode function generating portion 102 conducts the automatic mode function generation processing (Step S4). Then, the processing returns to Step S1 and as long as the same device is continuously used, the automatic mode function generation processing will be repeated.

By contrast, when the determination is made that the automatic mode function of other device is to be ported (YES in Step S3), the automatic mode function generating portion 102 conducts the automatic mode function porting processing (Step S5). The automatic mode function porting processing includes porting source device selection processing, change point detection processing, and automatic mode setting processing.

In the following, the automatic mode function generation processing and the automatic mode function porting processing will be described with reference to the drawings.

Figure 18:
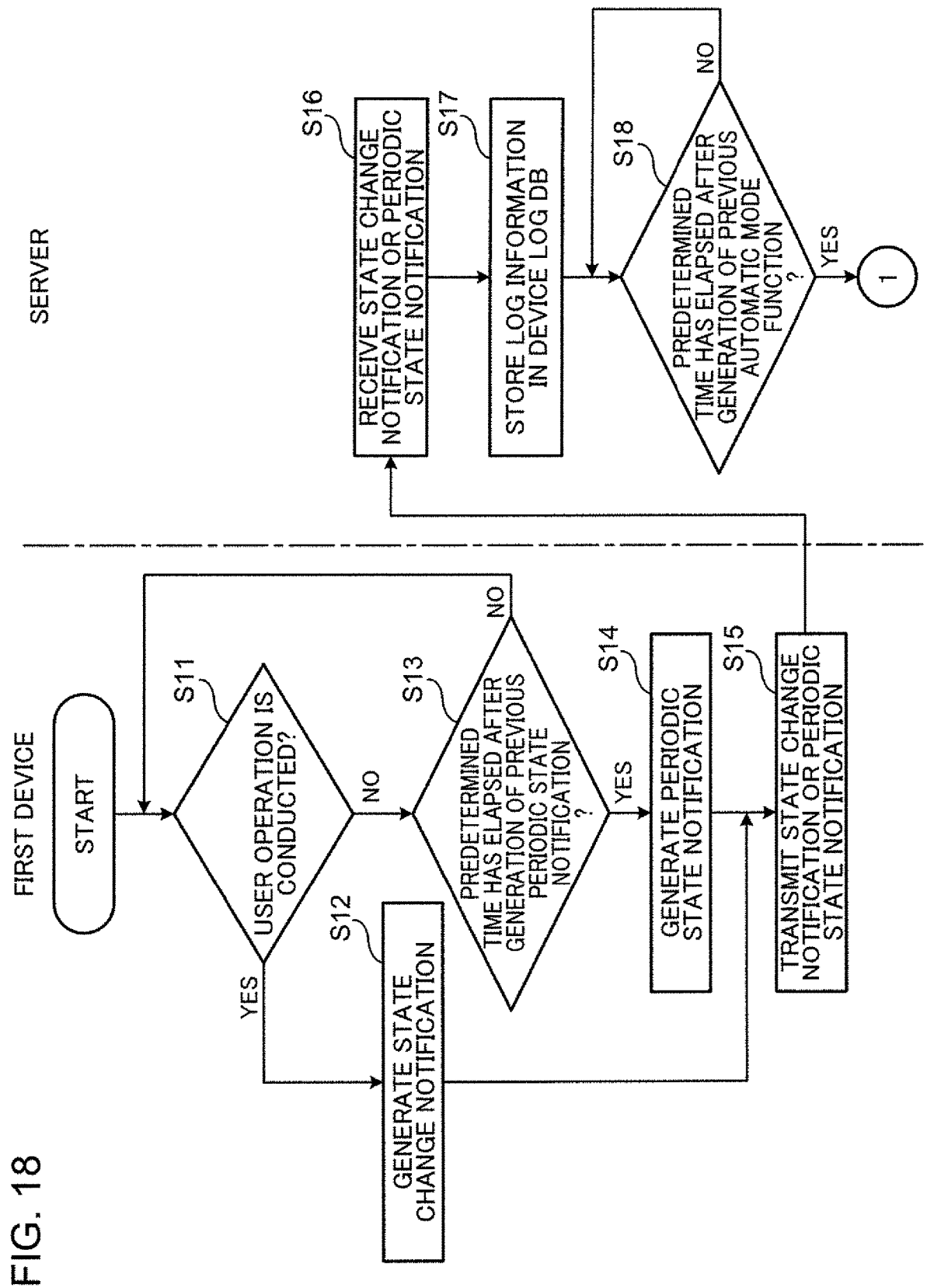
FIG. 18 is a first flow chart for describing automatic mode function generation processing in the device control system.
Figure 19:
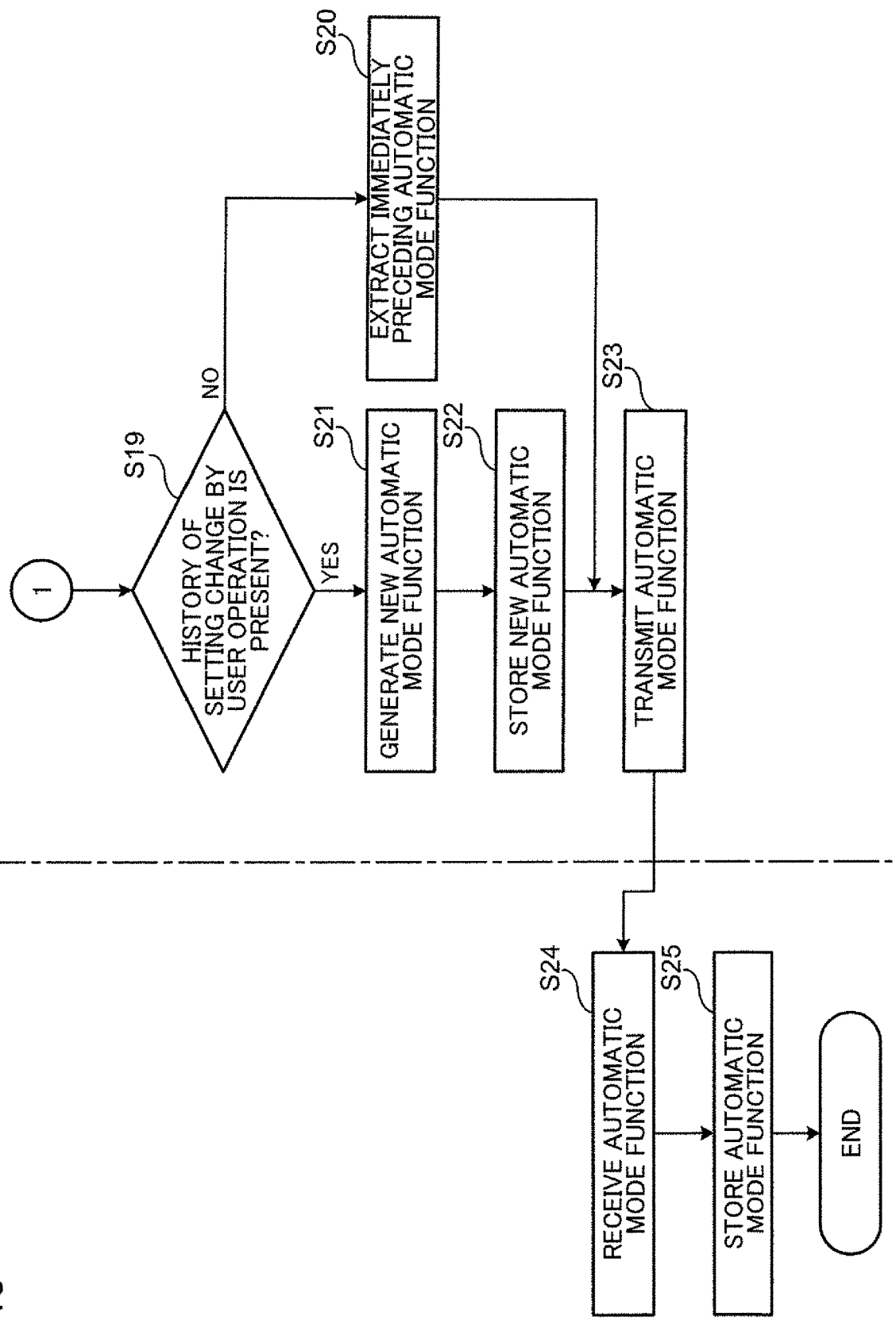
FIG. 19 is a second flow chart for describing the automatic mode function generation processing in the device control system.

FIG. 18 is a first flow chart for describing the automatic mode function generation processing in the device control system, and FIG. 19 is a second flow chart for describing the automatic mode function generation processing in the device control system. In the following, description will be made of the automatic mode function generation processing for generating an automatic mode function for use in the first device 200.

First, the operation control unit 202 of the first device 200 determines whether or not user operation by the first operation device 500 or the mobile terminal 400 has been conducted (Step S11). The user operation represents ON operation of the first device 200, OFF operation of the first device 200, or operation of changing a set value of the first device 200. When determination is made that user operation has been conducted (YES in Step S11), the operation control unit 202 generates a state change notification including the log information of the first device 200 changed by the user operation (Step S12).

By contrast, when the determination is made that user operation has not been conducted (NO in Step S11), the operation control unit 202 determines whether or not a predetermined time has elapsed after generation of a previous periodic state notification (Step S13). The predetermined time is, for example, five minutes. When the determination is made herein that the predetermined time has elapsed after the generation of the previous periodic state notification (YES in Step S13), the operation control unit 202 generates a periodic state notification including the current log information of the first device 200 (Step S14). By contrast, when the determination is made that the predetermined time has not elapsed after the generation of the previous periodic state notification (NO in Step S13), the processing returns to Step S11, so that the operation control unit 202 again determines whether or not user operation has been conducted.

Next, the communication unit 201 transmits the state change notification or the periodic state notification generated by the operation control unit 202 to the server 100 (Step S15).

Next, the communication unit 101 of the server 100 receives the state change notification or the periodic state notification transmitted by the first device 200 (Step S16).

Next, the communication unit 101 stores log information included in the state change notification or the periodic state notification in the device log DB 107 (Step S17).

Next, the automatic mode function generating portion 102 determines whether or not a predetermined period has elapsed after the generation of the previous automatic mode function (Step S18). The predetermined period is, for example, one week. When the determination is made herein that the predetermined period has not elapsed after the generation of the previous automatic mode function (NO in Step S18), the automatic mode function generating portion 102 subsequently determines whether or not the predetermined period has elapsed after the generation of the previous automatic mode function.

Although in the present embodiment, the processing of Step S18 is repeated until the predetermined period elapses when the determination is made that the predetermined period has not elapsed after the generation of the previous automatic mode function, the present disclosure is not particularly limited thereto, and the automatic mode function generation processing may be ended when the determination is made that the predetermined period has not elapsed after the generation of the previous automatic mode function.

By contrast, when the determination is made that the predetermined period has elapsed after the generation of the previous automatic mode function (YES in Step S18), the automatic mode function generating portion 102 determines whether or not the device log DB 107 has a history of setting change by user operation (Step S19). The determination processing in Step S19 is conducted by determining whether or not log information indicating that the user operation flag in the device log DB 107 is "1" is present. When the determination is made herein that the device log DB 107 does not have a history of setting change by user operation (NO in Step S19), the automatic mode function generating portion 102 extracts, from the automatic mode function DB 106, an automatic mode function generated immediately before (Step S20). When the automatic mode function generated immediately before is extracted, the automatic mode function generating portion 102 may only update the date of the automatic mode function DB 106, or store the extraction date and the extracted automatic mode function in the automatic mode function DB 106 in association with each other.

By contrast, when the determination is made that the device log DB 107 has a history of setting change by user operation (YES in Step S19), the automatic mode function generating portion 102 extracts, from the automatic mode function DB 106, the automatic mode function generated immediately before, and extracts log information for a predetermined period from the device log DB 107, thereby generating a new automatic mode function based on the extracted automatic mode function and log information (Step S21).

Next, the automatic mode function generating portion 102 stores the generated automatic mode function in the automatic mode function DB 106 (Step S22).

Next, the communication unit 101 transmits the automatic mode function extracted or generated by the automatic mode function generating portion 102 to the first device 200 (Step S23).

Next, the communication unit 201 of the first device 200 receives the automatic mode function transmitted by the server 100 (Step S24).

Next, the communication unit 201 stores the received automatic mode function in the automatic mode function storage unit 203 (Step S25). At this time, in a case where an automatic mode function is already stored in the automatic mode function storage unit 203, the stored automatic mode function is overwritten with the received automatic mode function.

In a case where a new automatic mode function is generated in the server 100 to update the automatic mode function in the automatic mode function DB 106, a user may be notified that the automatic mode function has been updated.

Figure 20:
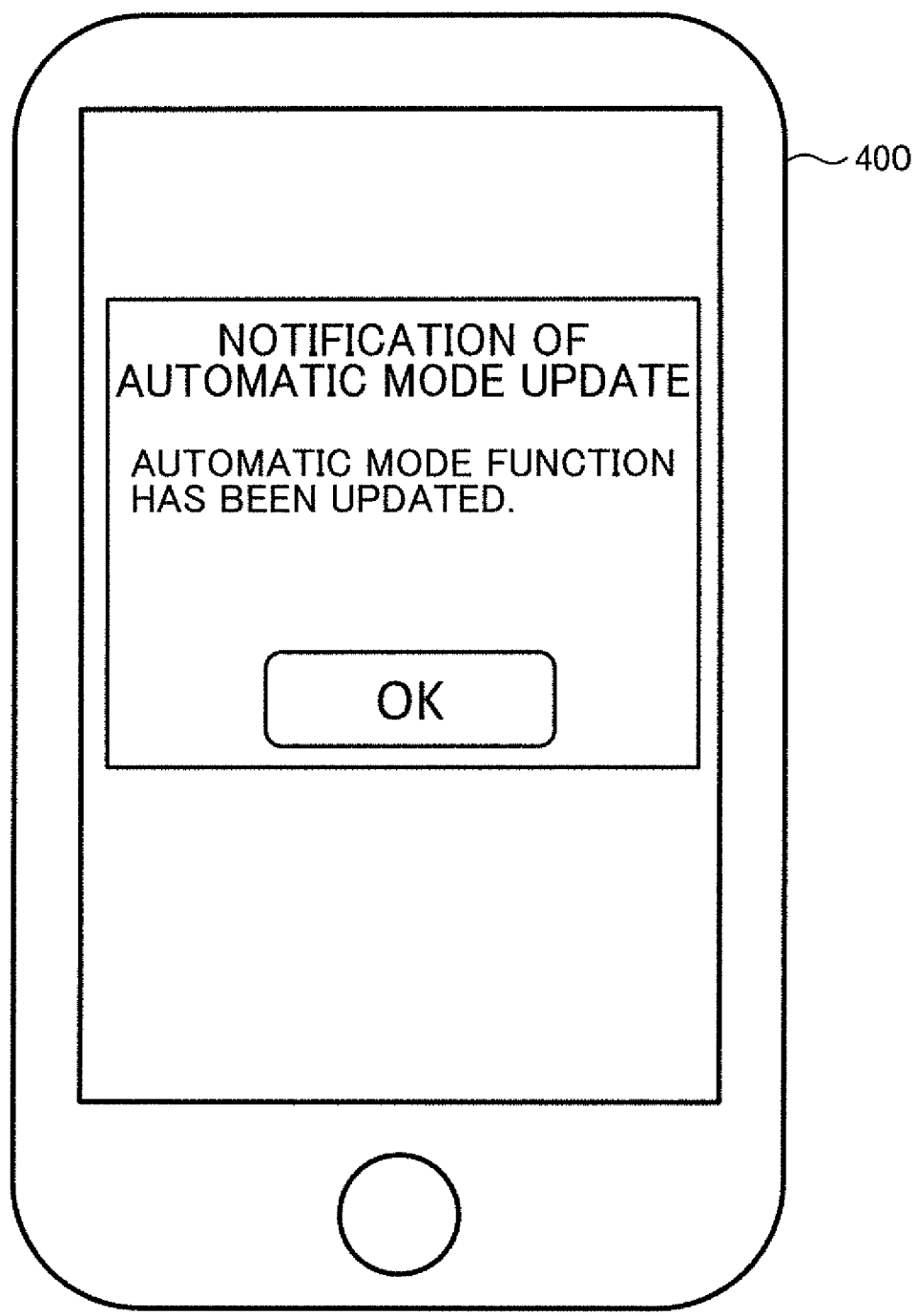
FIG. 20 is a view showing one example of a notification screen for notifying a user that an automatic mode function has been updated.

FIG. 20 is a view showing one example of a notification screen for notifying a user that an automatic mode function has been updated.

The communication unit 101 of the server 100 transmits notification information for notifying that an automatic mode function of the first device 200 has been updated to the mobile terminal 400. The communication unit 401 of the mobile terminal 400 receives the notification information transmitted by the server 100. Upon reception of the notification information, the input/output unit 403 displays a notification screen for notifying that an automatic mode function of the first device 200 has been updated.

The input/output unit 403 of the mobile terminal 400 displays the notification screen shown in FIG. 20. The notification screen shown in FIG. 20 notifies that the automatic mode function of the first device 200 has been updated.

In a case where a new automatic mode function is generated in the server 100, it is possible to confirm with a user whether or not the automatic mode function of the first device 200 can be updated to a new automatic mode function.

Figure 21:
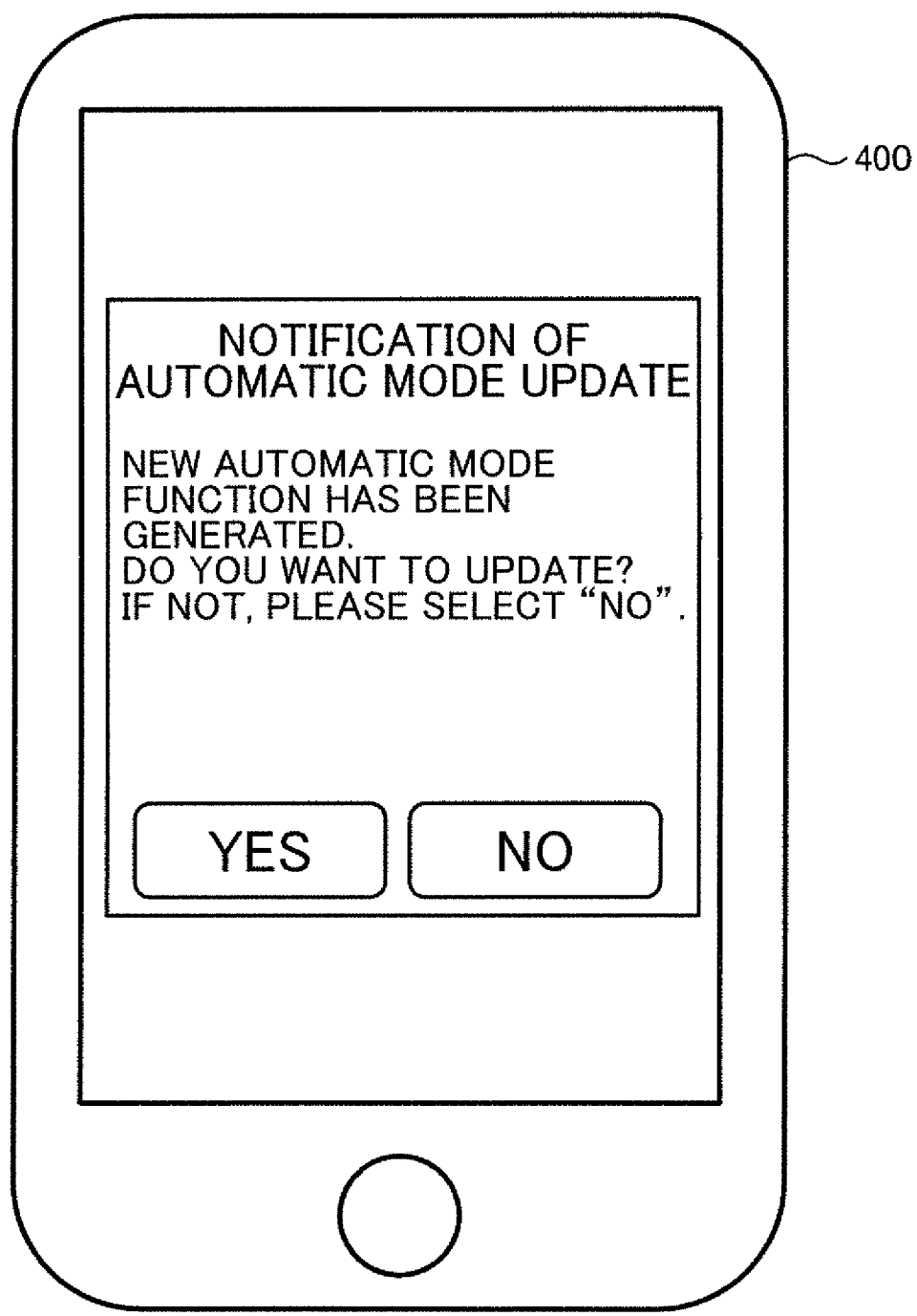
FIG. 21 is a view showing one example of a confirmation screen for confirming whether or not to update the automatic mode function of the first device.

FIG. 21 is a view showing one example of a confirmation screen for confirming whether or not to update the automatic mode function of the first device.

The communication unit 101 of the server 100 transmits a confirmation request for confirming whether or not to update the automatic mode function of the first device 200 to the mobile terminal 400. The communication unit 401 of the mobile terminal 400 receives the confirmation request transmitted by the server 100. Upon reception of the confirmation request, the input/output unit 403 displays the confirmation screen for confirming whether or not to update the automatic mode function of the first device 200.

The input/output unit 403 of the mobile terminal 400 displays the confirmation screen shown in FIG. 21. On the confirmation screen, user input is accepted as to whether or not to update the automatic mode function stored in the automatic mode function DB 106 to a new automatic mode function. The user selects whether or not to update the automatic mode function of the first device 200. The communication unit 401 of the mobile terminal 400 transmits response information indicating whether or not to update the automatic mode function of the first device 200 to the server 100. The communication unit 101 of the server 100 receives the response information transmitted by the mobile terminal 400. Upon reception of the response information indicating that the automatic mode function of the first device 200 is to be updated, the automatic mode function generating portion 102 stores a new automatic mode function in the automatic mode function DB 106. By contrast, upon reception of response information indicating that the automatic mode function of the first device 200 is not to be updated, the automatic mode function generating portion 102 discards the new automatic mode function and extracts, from the automatic mode function DB 106, the automatic mode function generated immediately before, to proceed to the processing in Step S23.

Next, automatic mode function porting processing of the device control system 10 will be described.

Figure 22:
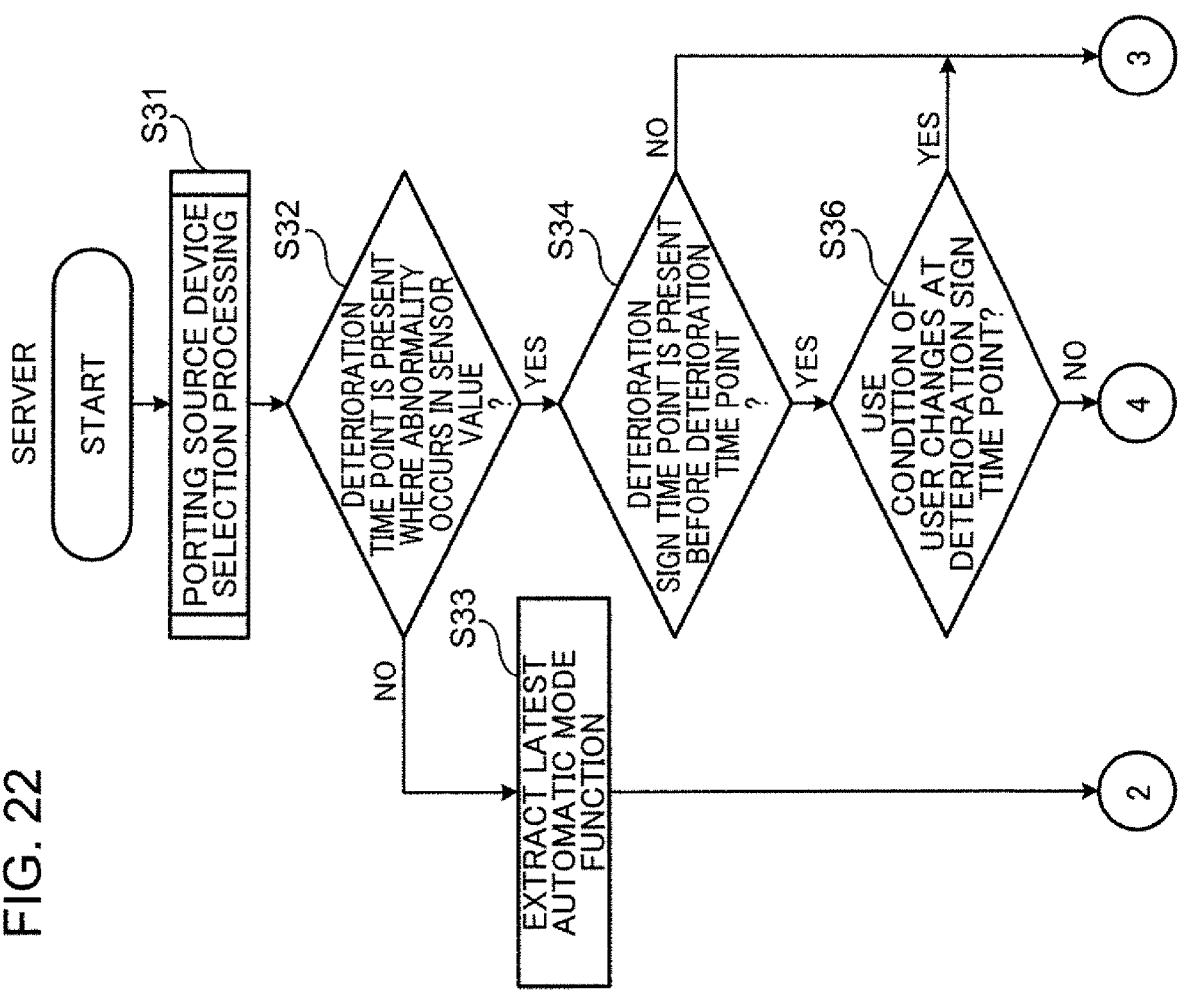
FIG. 22 is a first flow chart for describing automatic mode function porting processing in the device control system.
Figure 23:
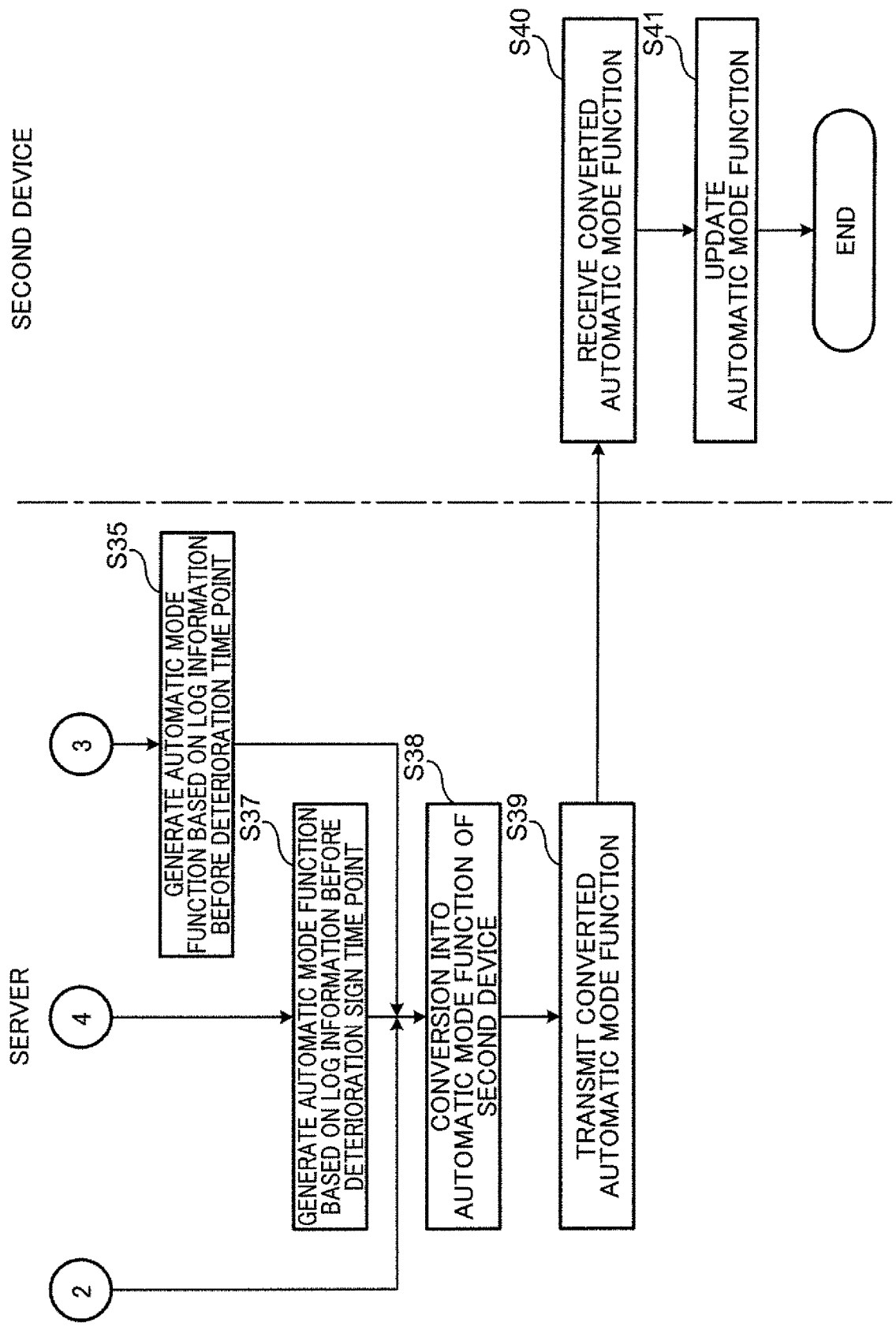
FIG. 23 is a second flow chart for describing the automatic mode function porting processing in the device control system.

FIG. 22 is a first flow chart for describing automatic mode function porting processing in the device control system, and FIG. 23 is a second flow chart for describing the automatic mode function porting processing in the device control system.

First, the control unit 1 of the server 100 conducts the porting source device selection processing for selecting a device to be an automatic mode function porting source from among a plurality of devices owned by a user (Step S31). In the porting source device selection processing, the mobile terminal 400 accepts user's input of a device to be an automatic mode function porting source, and at this time, the mobile terminal 400 transmits, to the server 100, a device ID of the device selected by the user to be an automatic mode function porting source.

Figure 24:
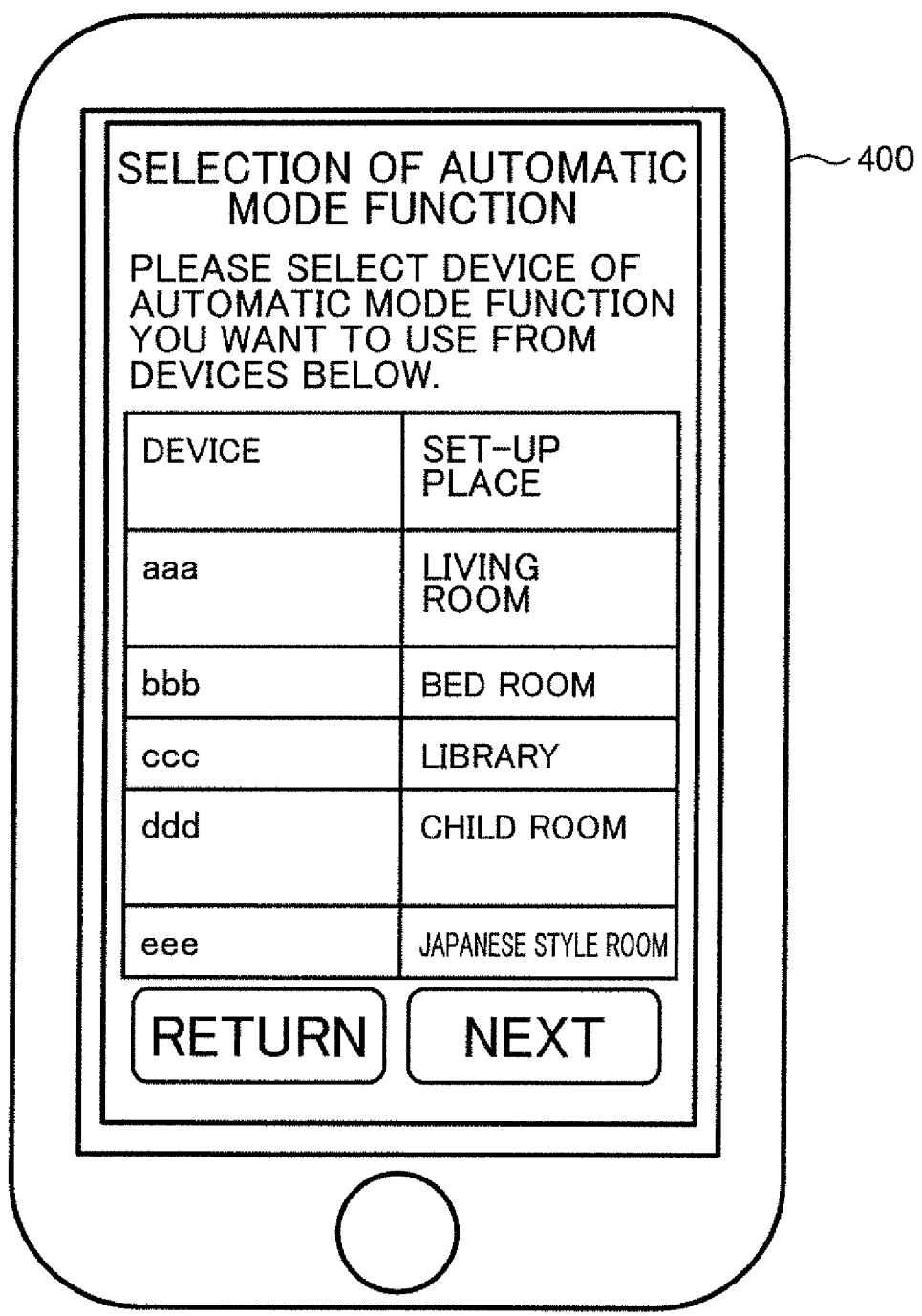
FIG. 24 is a view showing one example of input to a selection screen for accepting user's selection of a device as an automatic mode function porting source.

FIG. 24 is a view showing one example of a selection screen for accepting user's selection of a device as an automatic mode function porting source. The input/output unit 403 of the mobile terminal 400 displays a list of devices held by the user on the selection screen for the automatic mode function. The user selects a device to which the automatic mode function is to be ported and presses a button ("next" in FIG. 24) for transmitting the device ID of the selected device to the server 100. The list of the devices to be displayed includes, for example, a device ID and a set-up place.

After the selection of a device as an automatic mode function porting source by a user, confirmation may be made as to whether to reflect an automatic mode function of the selected device.

Figure 25:
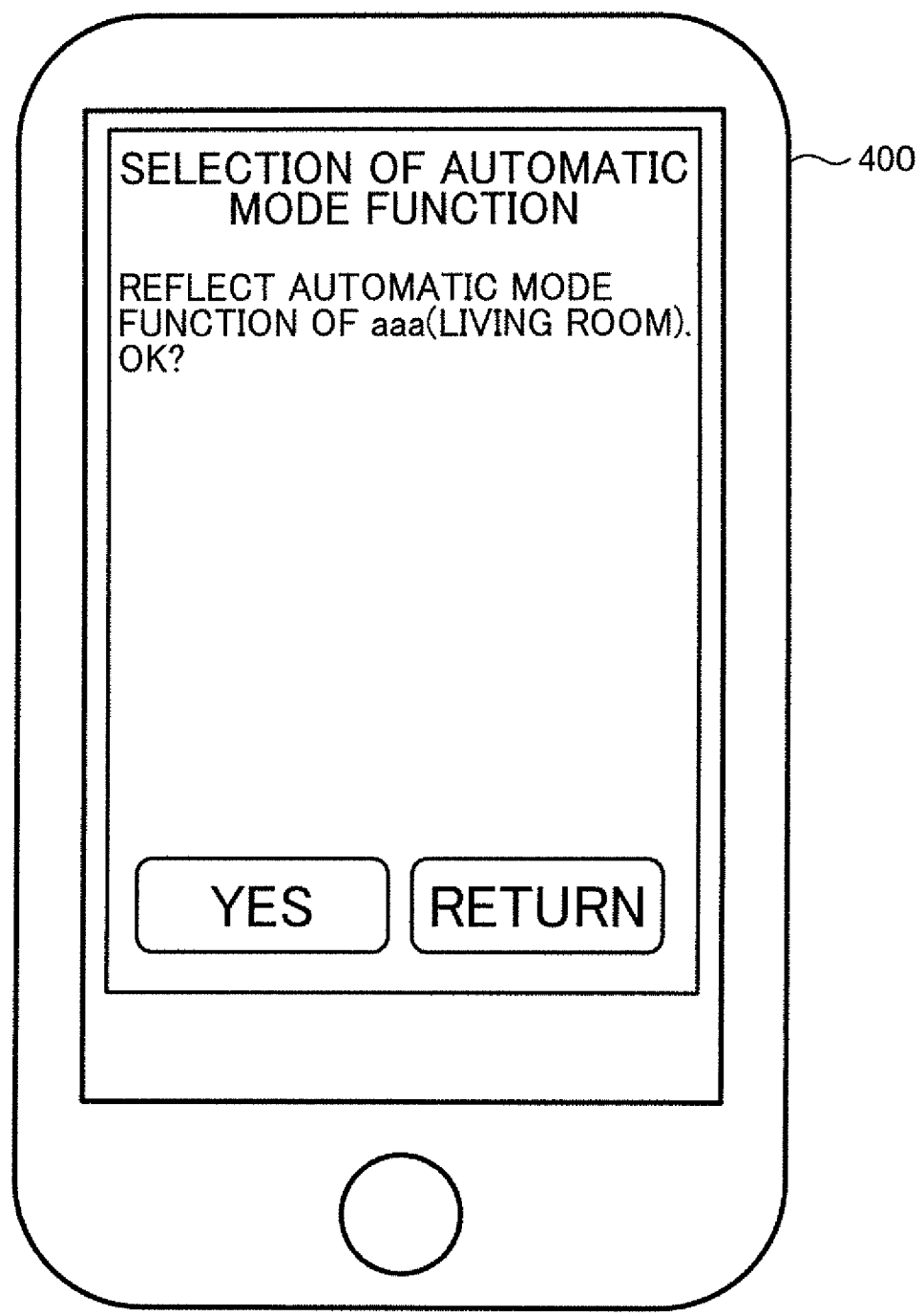
FIG. 25 is a view showing one example of a confirmation screen for confirming whether the automatic mode function of the selected device may be reflected.

FIG. 25 is a view showing one example of a confirmation screen for confirming whether the automatic mode function of the selected device may be reflected. As shown in FIG. 25, after the user selects a device to which the automatic mode function is to be ported, the input/output unit 403 of the mobile terminal 400 may display the confirmation screen for confirming whether to port (reflect) the automatic mode function of the selected device.

At the time of porting an automatic mode function, a user presses, on the confirmation screen, a button ("Yes" in FIG. 25) for transmitting a device ID of the selected device to the server 100. By contrast, in a case where the automatic mode function is not ported, the user presses, on the confirmation screen, a button ("return" in FIG. 25) for displaying the selection screen (FIG. 24) for selecting a device to be an automatic mode function porting source.

In the present embodiment, the first device 200 is an automatic mode function porting source device and the second device 300 is an automatic mode function porting destination device.

Next, the change point detection portion 103 of the server 100 extracts log information corresponding to a device ID of the first device 200 selected as a porting source device from the device log DB 107 to determine whether or not the extracted log information has a deterioration time point where abnormality of a sensor value occurs (Step S32).

Description will be made herein of processing of detecting a deterioration time point by the change point detection portion 103 of the server 100 with reference to FIG. 26.

Figure 26:
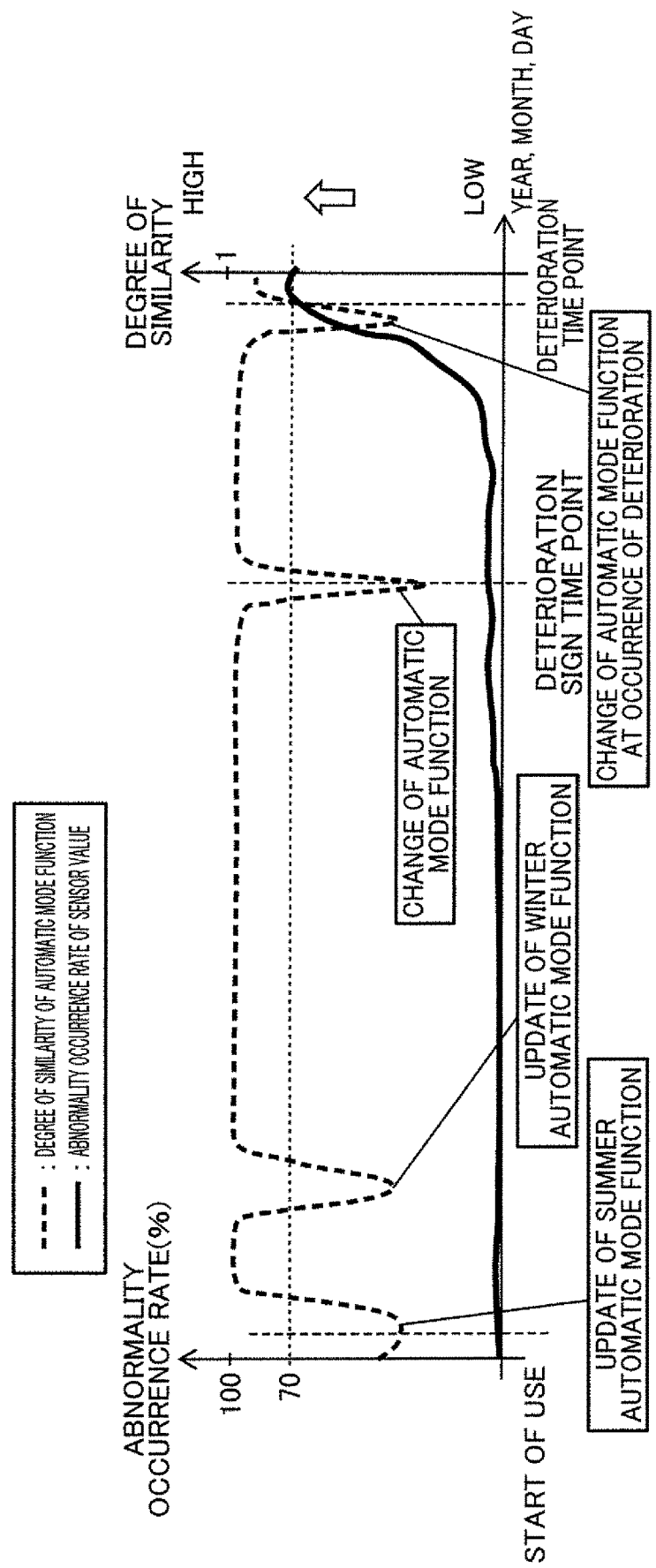
FIG. 26 is a diagram for describing processing of detecting a deterioration time point and a deterioration sign time point from log information of the first device.

FIG. 26 is a diagram for describing processing of detecting a deterioration time point and a deterioration sign time point from the log information of the first device. In FIG. 26, a solid line represents an abnormality occurrence rate of a sensor value, a vertical axis represents an abnormality occurrence rate, and a horizontal axis represents year, month, day.

Regarding abnormality of a sensor value, the change point detection portion 103 calculates, for example, an abnormality occurrence rate of a sensor value on each day based on the log information in the device log DB 107. The abnormality occurrence rate represents at which rate a sensor value becomes unbalanced or a numerical value abnormality occurs in log information of one day. Then, the change point detection portion 103 determines that a deterioration time point is present where abnormality of a sensor value occurs, when there exists a day in which the abnormality occurrence rate is not less than a predetermined value, e.g., 70% or more.

For example, when a difference between two sensor values correlated with each other is not less than a predetermined value, the change point detection portion 103 may determine that a sensor value becomes unbalanced. For example, in a case where there is a correlation between an outside temperature and a room temperature and the room temperature is extremely lower or higher than the outside temperature, there is a possibility that abnormality has occurred in either the outside temperature sensor or the room temperature sensor. Therefore, the change point detection portion 103 determines that the sensor value becomes unbalanced in a case where the difference between the outside temperature and the room temperature is not less than a predetermined value.

The change point detection portion 103 may also determine that a numerical value abnormality has occurred when, for example, a certain sensor value exceeds a predetermined numerical value range. For example, in a case where an outside temperature measured in summer is 5° C., there is a possibility that abnormality has occurred in an outside temperature sensor. Therefore, the change point detection portion 103 determines that a numerical value abnormality of a sensor value has occurred when the outside temperature exceeds a predetermined numerical value range (e.g., a range of 20° C. to 40° C.).

When the determination is made that a deterioration time point is not present where abnormality of a sensor value occurs (NO in Step S32), the automatic mode function generating portion 102 extracts a latest automatic mode function from the automatic mode function DB 106 (Step S33).

By contrast, when the determination is made that a deterioration time point is present where abnormality of the sensor value occurs (YES in Step S32), the change point detection portion 103 determines whether or not a deterioration sign time point is present where an automatic mode function changes before the deterioration time point (Step S34).

In FIG. 26, a dashed line represents a degree of similarity of an automatic mode function, a vertical axis represents a degree of similarity, and a horizontal axis represents year, month, day.

The change point detection portion 103 determines whether or not a deterioration sign time point is present before a deterioration time point, by calculating degrees of similarity between automatic mode functions before and after updating to detect a day when the degree of similarity between the automatic mode functions becomes a predetermined value or less. The degree of similarity is expressed within a range of 0 to 1. It is determined that the closer to "1" the degree of similarity becomes, the higher the degree of similarity of the automatic mode functions before and after updating is. For example, in a case were an automatic mode function is updated every week, the change point detection portion 103 calculates a degree of similarity between a current automatic mode function and an automatic mode function a week before.

As shown in FIG. 26, for example, when first summer or first winter comes after start of use of the system, an initially set automatic mode function is updated to an automatic mode function reflecting user's preference, so that a degree of similarity between the automatic mode functions before and after updating largely decreases. On the other hand, since once obtained automatic mode function is held as it is for several years, the automatic mode functions before and after updating change little to maintain a high degree of similarity.

There is a case where a sign of deterioration appears in a device before the device deteriorates. For example, in a case where a failure occurs in a sensor value of a device, and the user changes setting by an operation instruction, an automatic mode function is updated to lower a degree of similarity between automatic mode functions before and after updating. Thus, detecting a time point where an automatic mode function has changed from an immediately preceding automatic mode function as a deterioration sign time point enables an inaccurate automatic mode function to be eliminated in a period from a deterioration time point to a deterioration sign time point.

The change point detection portion 103 determines whether or not a deterioration sign time point is present where among a plurality of automatic mode functions, an automatic mode function generated before the deterioration time point has changed from an immediately preceding automatic mode function. Although the degree of similarity between the automatic mode functions before and after updating is reduced by a predetermined value or more immediately before the deterioration time point as shown in FIG. 26, since the reduction is caused by a sensor value abnormality, this time point is not detected as a deterioration sign time point.

In a case where the determination is made that a deterioration sign time point is not present before the deterioration time point (NO in Step S34), the automatic mode function generating portion 102 generates an automatic mode function based on log information before the deterioration time point (Step S35). The automatic mode function generating portion 102 may extract an automatic mode function stored immediately before the deterioration time point from the automatic mode function DB 106.

By contrast, in a case where the determination is made that a deterioration sign time point is present before the deterioration time point (YES in Step S34), the change point detection portion 103 determines whether or not a use condition of the user has changed at the deterioration sign time point (Step S36). A change in a use condition of a user represents, for example, a change of a family structure or a change of a furniture disposition. The change point detection portion 103 determines whether a change of the automatic mode function is caused by a sign of deterioration or a change in a use condition of a user. The degree of similarity between the automatic mode functions before and after updating is reduced not only when the first device 200 deteriorates but also when a use condition of the user changes. When the change of the automatic mode function is caused by a change in a use condition of the user, an automatic mode function may be generated using log information in a period from the deterioration time point to the deterioration sign time point.

The change point detection portion 103 can determine whether or not a family structure has changed or a furniture disposition has changed by using a sensor value of a human sensor or a heat sensor provided in the first device 200. Also in the processing in Step S36, the mobile terminal 400 may display a confirmation screen for confirming whether or not a use condition of the user has changed at a past deterioration sign time point and accept input operation by the user. The server 100 may receive information about whether or not a use condition of the user has changed from the mobile terminal 400.

In a case where the determination is made that the use condition of the user has changed at the deterioration sign time point (YES in Step S36), the automatic mode function generating portion 102 generates an automatic mode function based on the log information before the deterioration time point (Step S35). In a case where the use condition of the user has changed at the deterioration sign time point, the automatic mode function generating portion 102 may read, from the automatic mode function DB 106, an automatic mode function at the time point where the use condition of the user has changed and use the read automatic mode function as it is.

By contrast, in a case where the determination is made that the use condition of the user has not changed at the deterioration sign time point (NO in Step S36), the automatic mode function generating portion 102 generates an automatic mode function based on log information before the deterioration sign time point (Step S37). The automatic mode function generating portion 102 may extract an automatic mode function stored immediately before the deterioration sign time point from the automatic mode function DB 106.

Next, the performance difference correcting portion 104 extracts a correction function for correcting a difference between the first device 200 and the second device 300 from the correction function storage portion 105 and converts the automatic mode function extracted or generated by the processing in Step S33, Step S35 and Step S37 into the automatic mode function of the second device 300 based on the extracted correction function (Step S38).

Next, the communication unit 101 transmits the automatic mode function converted by the performance difference correcting portion 104 to the second device 300 (Step S39).

Next, the communication unit 301 of the second device 300 receives the converted automatic mode function which is transmitted by the server 100 (Step S40).

Next, the communication unit 301 overwrites the automatic mode function storage unit 303 with the received automatic mode function to update the automatic mode function (Step S41).

At the completion of the series of processing for porting the automatic mode function of the first device 200 to the second device 300, the communication unit 301 of the second device 300 may transmit a completion notification to the mobile terminal 400 which conducts registration processing of the second device 300.

Figure 27:
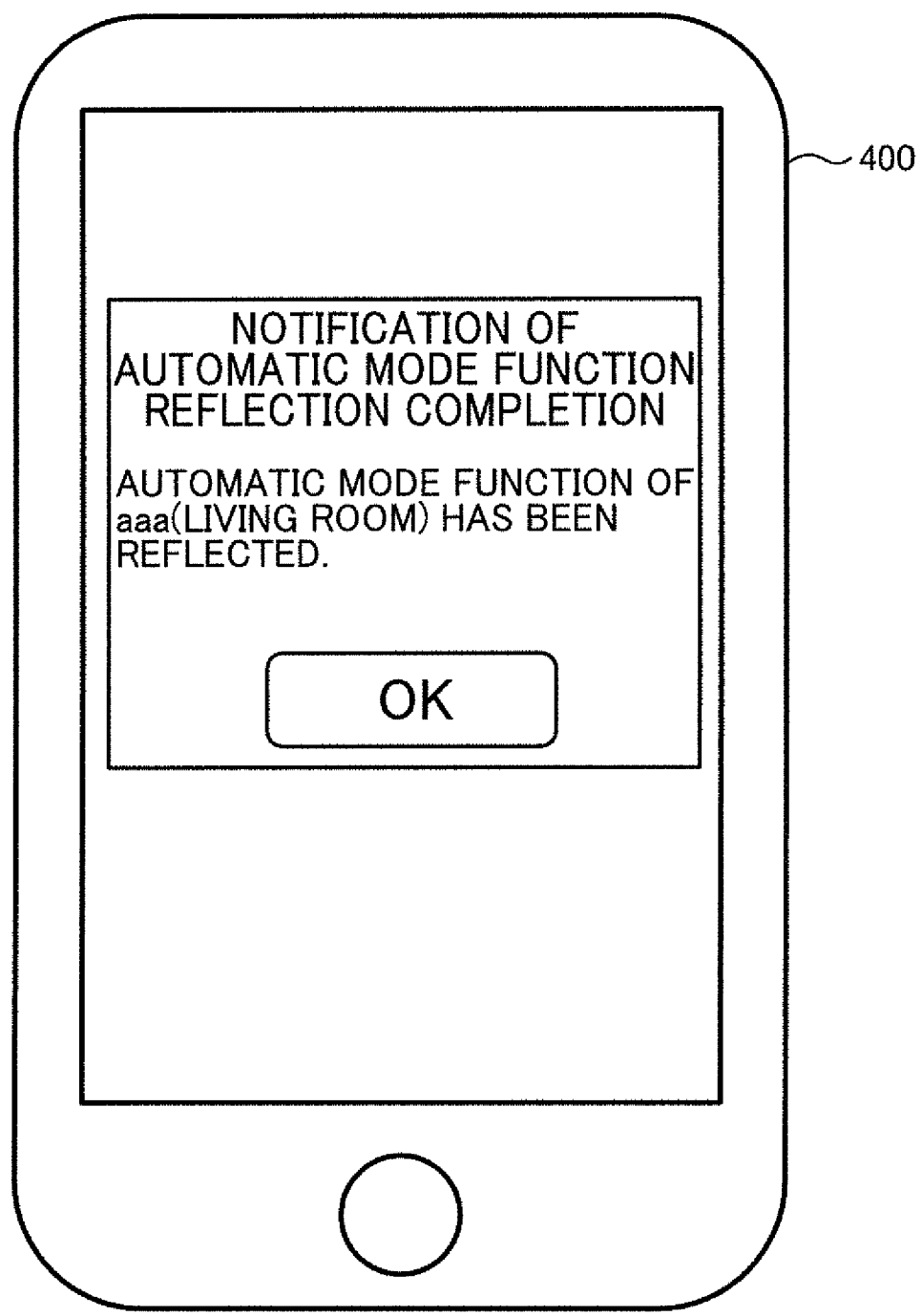
FIG. 27 is a view showing one example of a notification screen for notifying a user that reflection of the automatic mode function has been completed.

FIG. 27 is a view showing one example of a notification screen for notifying a user that reflection of the automatic mode function has been completed.

The communication unit 301 of the second device 300 transmits, to the mobile terminal 400, notification information for notifying that the automatic mode function of the first device 200 has been reflected on the automatic mode function of the second device 300. The communication unit 401 of the mobile terminal 400 receives the notification information transmitted by the second device 300. Upon reception of the notification information, the input/output unit 403 displays a notification screen for notifying that the automatic mode function of the first device 200 has been reflected on the automatic mode function of the second device 300.

The input/output unit 403 of the mobile terminal 400 displays the notification screen shown in FIG. 27. On the notification screen shown in FIG. 27, an automatic mode function porting source device is displayed to notify a user that reflection of the automatic mode function of the second device 300 is completed.

In the present embodiment, at the time of replacement of a device, an automatic mode function generated in a former device is ported to a new device after correction of performance difference between main bodies of the former device and the new device. Additionally, at the time of porting the automatic mode function of the former device to the new device, deterioration or a deterioration sign of the former device or a change in the use condition of the user is detected, and a detection result is used for generation of an automatic mode function of the former device at the time of porting.

This enables porting of an automatic mode function required in a new device by a user taking into consideration a change of an automatic mode function according to deterioration or a deterioration sign of the former device or a change in the use condition of the user.

Description will be made herein of a difference between control contents of the second device 300 in the automatic mode in a case where the automatic mode function of the first device 200 is corrected and in a case where the same is not corrected based on a performance difference between the first device 200 and the second device 300 at the time of porting the automatic mode function of the first device 200 to the second device 300.

FIG. 28 is a diagram for describing control contents of the second device in the automatic mode in a case where at the time of porting an automatic mode function of the first device to the second device, the automatic mode function of the first device is not corrected based on a performance difference between the first device and the second device. FIG. 29 is a diagram for describing control contents of the second device in the automatic mode in a case where at the time of porting the automatic mode function of the first device to the second device, the automatic mode function of the first device is corrected based on a performance difference between the first device and the second device.

FIG. 28 and FIG. 29 show setting examples of the first device 200 and the second device 300 on a day when an outside temperature is 30° C. or above. The first device 200 and the second device 300 are air conditioners. The graphs are expressed by three axes of a set temperature, a set wind volume, and an outside temperature. As in a case of a home appliance, when purchasing a new home appliance after using the home appliance for years, a performance difference between the first device 200 and the second device 300 may be increased due to improvement in performance. Therefore, in a case where the automatic mode function of the first device 200 is ported to the second device 300 without correcting a performance difference between the first device 200 and the second device 300 as shown in FIG. 28, controlling the second device 300 in the same manner as in the first device 200 increases a range of a set wind volume to make a user uncomfortable because of overcooling or the like. By contrast, in a case where the automatic mode function of the first device 200 is ported to the second device 300 with correction of a performance difference between the first device 200 and the second device 300 as shown in FIG. 29, even when the second device 300 is controlled in the same manner as in the first device 200, a set wind volume is corrected to be within an appropriate range to enable control to avoid overcooling.

(Modifications)

(1) The first device 200 and the second device 300 in the present embodiment are air conditioners, but may be other devices. The first device 200 and the second device 300 may be a washing machine and cooking home appliances such as a rice cooker. If the first device 200 and the second device

300 are, for example, washing machines, each device has a function of preserving setting contents unique to a user, and setting contents of an old washing machine unique to the user are ported to a new washing machine. This saves user's labor of getting used to performance of the new washing machine and enables a user to perform washing by the same setting as that of the old washing machine.

(2) While in the present embodiment, information to be notified to a user is notified by the mobile terminal 400, the information may not be notified by the mobile terminal 400. The information may be notified by a smart device carried by a user, or when the user is determined to be at home, may be notified by a smart speaker. Even when the user does not carry the mobile terminal 400, this enables notification by a smart device or a smart speaker as user's belongings.

(3) While in the present embodiment, the automatic mode function generating portion 102 updates an automatic mode function using log information for one week, the log information to be used may not necessarily be log information for one week. The automatic mode function generating portion 102 may update an automatic mode function using an operation history for three weeks. Even when a user has a life pattern varying with each day of the week to have an irregular schedule, this enables classification into irregular control and ordinary control.

(4) While in the present embodiment, an automatic mode function is constantly updated, in a case where log information is changed a predetermined number of times, the automatic mode function may be updated using the changed log information. For example, in a case where the determination is made that log information has been changed ten times, the automatic mode function generating portion 102 may use the changed log information as a learning target. This enables cost-down of the server 100 which produces an automatic mode function when the automatic mode function does not change for a predetermined period. Additionally, Modification (4) may be designed in combination with Modification (3).

(5) While in the present embodiment, a deterioration time point is determined by an abnormality occurrence rate indicating a rate of occurrence of unbalance of a sensor value or a numerical value abnormality of a sensor value with respect to log information for one day, a numerical value abnormality of a specific sensor value may be included for the determination. This enables detection of an apparent abnormality in a case where abnormality occurs steadily but an abnormality occurrence rate is low.

(6) While in the present embodiment, the description has been made of replacement of devices arranged in the same room, the device control system may be applied also to a case where a device is moved to a different room. For example, the device control system may be applied to a case where a device is moved to a bed room from a living room. At this time, for example, a reason for layout change or user's wind direction setting is estimated using a sensor value and an operation history. This enables control according not only to performance difference between main bodies of the former device and the new device but also to layout, thereby allowing control reflecting user's preference such as designation of a place to which no wind is to be directly hit.

Additionally, in a case of moving a device to a different room, the automatic mode function generating portion 102 may correct an automatic mode function based on environments of a moving destination place such as a size of a room.

(7) While in the present embodiment, an automatic mode function of one device is ported to one device, an automatic mode function of one device may be ported to two or more devices set up in different rooms. For example, in a case where a plurality of persons using different devices live together and use a plurality of devices, an automatic mode function of each device may be ported to a plurality of devices. This enables control merging each user's preference of each of the plurality of devices.

(8) In the present embodiment, it is further possible to specify a user staying in a room by grasping a home condition and generate an automatic mode function based on only an operation history of the specified user. This increases precision to enable control adapted to an individual user.

(9) While in the present embodiment, an automatic mode function of one device is ported to one device in the same room, automatic mode functions of two or more devices set up in different rooms may be ported to one device. For example, in a case where a user living with family members moves to a one-room flat for living alone, an automatic mode function of an air conditioner in a living room and an automatic mode function of an air conditioner in a bed room may be put together to be ported to one air conditioner, or an automatic mode function of the air conditioner in the living room and an automatic mode function of an air conditioner in a child room may be put together to be ported to one air conditioner. By porting an automatic mode function of a device in each separate room to one device, one user's preference may be extracted and reflected on control of one device.

(10) While in the present embodiment, notification information for notifying a user that an automatic mode function of the first device 200 has been updated is transmitted to the mobile terminal 400 upon completion of updating, the notification information may be transmitted to the first operation device 500 or the mobile terminal 400 at the time of first ON operation after the completion of updating. This saves labor for checking notification information when a user conducts no operation.

(11) While in the present disclosure, a model (automatic mode function) is created using a regression function, the present disclosure is not limited thereto. For example, another possible method is generating a feature amount from log information and subjecting the feature amount to a classifier to create a model (automatic mode function). Other than the above, possible models (automatic mode functions) include a neural network (including deep learning using a multilayer neural network) used in machine learning, genetic programming, a decision tree, a Bayesian network, and a support vector machine (SVM).

(12) A part or all of components constituting each of the above devices may be formed with one system LSI (Large Scale Integration: large scale integrated circuit). The system LSI is a super-multifunctional LSI manufactured by integrating a plurality of constituent portions on one chip, specifically, a computer system configured to include a microprocessor, ROM, RAM, and the like. A computer program is stored in the RAM. As a result of operation of the microprocessor according to the computer program, the system LSI realizes a function thereof.

Additionally, each portion of the components constituting each of the above devices may be individually made into a chip, or a part or all of the portions may be made into one chip.

A system LSI used herein may be referred to as IC, LSI, a super LSI, or an ultra LSI according to a difference in integrality in some cases. A circuit integration method is not limited to LSI, but may be realized by a dedicated circuit or a general-purpose processor. A programmable FPGA (Field Programmable Gate Array), or a reconfigurable processor enabling reconfiguration of connection and setting of a circuit cell in an LSI after production of an LSI may be used.

Further, when advances in semiconductor technology or the advent of other derivative techniques produces a new circuit integration technique replacing LSI, a function block may be integrated using the technique as a matter of course. Biotechnology is among possible applications.

(13) A part or all of the components constituting each of the above devices may be formed with an IC card or a single module detachable to each device. The IC card or the module is a computer system configured with a microprocessor, ROM, RAM, and the like. The IC card or the module may include the above super-multifunctional LSI. Operation of a microprocessor according to a computer program enables the IC card or the module to realize a function thereof. The IC card or the module may be tamper resistant.

(14) The present disclosure may be directed to the above-described method. Alternatively, the present disclosure may be directed to a computer program realizing the method by means of a computer, or a digital signal including the computer program.

Additionally, the present disclosure may be directed to the computer program or the digital signal recorded in a computer-readable recording medium such as, for example, a flexible disk, a hard disk, CD-ROM, MO, DVD, DVD-ROM, DVD-RAM, BD (Blu-ray (registered trademark) Disc), or a semiconductor memory, or the digital signal recorded in these recording media.

The present disclosure may be also directed to the computer program or the digital signal transmitted via telecommunication lines, wireless communication line or wired communication line, networks represented by the Internet, data broadcasting, or the like.

The present disclosure may be also directed to a computer system including a microprocessor and a memory, in which the memory stores the above computer program and the microprocessor operates according to the computer program.

The present disclosure may be also directed to other independent computer system realized by transferring the program or the digital signal recorded in the recording medium, or transferring the program or the digital signal via the network or the like.

(15) The above embodiment and the above modifications may be combined.

The device control method, the device control apparatus, and the device control system according to the present disclosure are useful as a device control method, a device control apparatus, and a device control system for controlling a second device connected in place of a first device, in which at the time of replacement of the first device by the second device, setting contents of the first device may be ported to the second device taking into consideration a difference between performance of the first device and performance of the second device, thereby providing an optimum environment according to user's preference.

This application is based on Japanese Patent application No. 2017-243691 filed in Japan Patent Office on Dec. 20, 2017 and Japanese Patent application No. 2018-140163 filed in Japan Patent Office on Jul. 26, 2018, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A device control method in a device control apparatus which controls a second device connected in place of a first device, the method comprising:
    acquiring first performance information indicative of performance of the first device and second performance information indicative of performance of the second device;
    generating a correction function based on a difference between the first performance information and the second performance information;
    generating, from first operation mode information for causing the first device to operate by first setting, the first operation mode information being generated based on log information of the first device, second operation mode information for causing the second device to operate by second setting corresponding to the first setting based on the correction function; and
    transmitting the second operation mode information to the second device, wherein
    the log information includes a sensor value, and
    the first operation mode information includes a plurality of pieces of the first operation mode information generated at every predetermined period, and
    the device control method further comprises detecting a first time point where abnormality of the sensor value has occurred in the past,
    wherein the generation of the second operation mode information includes extracting the first operation mode information generated before the first time point from among the plurality of pieces of first operation mode information and generating the second operation mode information from the extracted first operation mode information based on the correction function.

2. The device control method according to claim 1, further comprising:
    acquiring a plurality of pieces of performance information each indicative of performance of each of a plurality of devices including the first device and the second device; and
    generating a plurality of correction functions based on a difference between performance information of each combination among the plurality of devices,
    wherein the generation of a correction function includes extracting the correction function corresponding to a combination between the first device and the second device from among the plurality of correction functions.

3. The device control method according to claim 1, wherein
    the device control apparatus is connected to a mobile terminal so as to be communicable, the mobile terminal being associated with the first device and the second device, and
    the device control method further comprises transmitting, to the mobile terminal, notification information for notifying a user to cause the second device to operate using the second operation mode information upon transmission of the second operation mode information to the second device.

4. The device control method according to claim 3, wherein the mobile terminal displays the notification information transmitted by the device control apparatus.

5. A device control method in a device control apparatus which controls a second device connected in place of a first device, the method comprising:
  acquiring first performance information indicative of performance of the first device and second performance information indicative of performance of the second device;
  generating a correction function based on a difference between the first performance information and the second performance information;
  generating, from first operation mode information for causing the first device to operate by first setting, the first operation mode information being generated based on log information of the first device, second operation mode information for causing the second device to operate by second setting corresponding to the first setting based on the correction function; and
transmitting the second operation mode information to the second device, wherein
  the log information includes a sensor value, and
  the device control method further comprises detecting a first time point where abnormality of the sensor value has occurred in the past,
  wherein the generation of the second operation mode information includes generating the first operation mode information based on the log information generated before the first time point and generating the second operation mode information from the generated first operation mode information based on the correction function.

6. A device control method in a device control apparatus which controls a second device connected in place of a first device, the method comprising:
  acquiring first performance information indicative of performance of the first device and second performance information indicative of performance of the second device;
  generating a correction function based on a difference between the first performance information and the second performance information;
  generating, from first operation mode information for causing the first device to operate by first setting, the first operation mode information being generated based on log information of the first device, second operation mode information for causing the second device to operate by second setting corresponding to the first setting based on the correction function; and
transmitting the second operation mode information to the second device, wherein
  the log information includes a sensor value, and
  the first operation mode information includes a plurality of pieces of the first operation mode information generated at every predetermined period, and
  the device control method further comprises:
  detecting a first time point where abnormality of the sensor value has occurred in the past; and
  determining whether or not a second time point is present where the first operation mode information generated before the first time point has changed from immediately preceding first operation mode information among the plurality of pieces of first operation mode information,
  wherein when the determination is made that the second time point is present, the generation of the second operation mode information includes extracting the first operation mode information generated before the second time point from among the plurality of pieces of first operation mode information and generating the second operation mode information from the extracted first operation mode information based on the correction function.

7. The device control method according to claim 6, wherein
  when the determination is made that the second time point is not present, the generation of the second operation mode information includes extracting the first operation mode information generated before the first time point from among the plurality of pieces of first operation mode information and generating the second operation mode information from the extracted first operation mode information based on the correction function.

8. The device control method according to claim 6, wherein
  when the determination is made that the second time point is not present, the generation of the second operation mode information includes generating the first operation mode information based on the log information before the first time point and generating the second operation mode information from the generated first operation mode information based on the correction function.

9. The device control method according to claim 6, wherein
  in determining whether or not the second time point is present, the determination is made that the second time point is present when a degree of similarity between the first operation mode information generated before the first time point and first operation mode information immediately preceding the first operation mode information is lower than a predetermined value.

10. A device control method in a device control apparatus which controls a second device connected in place of a first device, the method comprising:
  acquiring first performance information indicative of performance of the first device and second performance information indicative of performance of the second device;
  generating a correction function based on a difference between the first performance information and the second performance information;
  generating, from first operation mode information for causing the first device to operate by first setting, the first operation mode information being generated based on log information of the first device, second operation mode information for causing the second device to operate by second setting corresponding to the first setting based on the correction function; and
transmitting the second operation mode information to the second device, wherein
  the log information includes a sensor value, and
  the first operation mode information includes a plurality of pieces of the first operation mode information generated at every predetermined period, and
  the device control method further comprises:
  detecting a first time point where abnormality of the sensor value has occurred in the past; and
  determining whether or not a second time point is present where the first operation mode information generated before the first time point has changed from immediately preceding first operation mode information among the plurality of pieces of first operation mode information, wherein when the determination is made that the second time point is present, the generation of the second operation mode information includes generating the first operation mode information based on the log information before the first time point and generating the second operation mode information from the generated first operation mode information based on the correction function.

\* \* \* \* \*